US012374798B2

(12) United States Patent
Hashemi et al.

(10) Patent No.: US 12,374,798 B2
(45) Date of Patent: Jul. 29, 2025

(54) ULTRA-LIGHT WEIGHT FLEXIBLE, COLLAPSIBLE AND DEPLOYABLE ANTENNAS AND ANTENNA ARRAYS

(71) Applicant: California Institute of Technology, Pasadena, CA (US)

(72) Inventors: Mohammed Reza M Hashemi, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 170 days.

(21) Appl. No.: 16/869,441

(22) Filed: May 7, 2020

(65) Prior Publication Data

US 2020/0373673 A1 Nov. 26, 2020

Related U.S. Application Data

(60) Provisional application No. 62/844,542, filed on May 7, 2019.

(51) Int. Cl.
*H01Q 9/04* (2006.01)
*H01Q 1/08* (2006.01)
(Continued)

(52) U.S. Cl.
CPC ............. *H01Q 9/0457* (2013.01); *H01Q 1/08* (2013.01); *H01Q 1/48* (2013.01);
(Continued)

(58) Field of Classification Search
CPC .... H01Q 15/167; H01Q 15/20; H01Q 21/065; H01Q 11/14; H01Q 1/28; H01Q 1/288;
(Continued)

(56) References Cited

U.S. PATENT DOCUMENTS 4,980,693 A 12/1990 Wong et al.
10,461,432 B1 * 10/2019 Walker .................. H01Q 1/082
(Continued)

FOREIGN PATENT DOCUMENTS

WO WO 2009/056642 A1 5/2009

OTHER PUBLICATIONS

PCT/US2020/031926 International Search Report and Written Opinion mailed Aug. 21, 2020.
(Continued)

*Primary Examiner* — Graham P Smith
(74) *Attorney, Agent, or Firm* — Weaver Austin Villeneuve & Sampson LLP

(57) ABSTRACT

An antenna includes, in part, first and second flexible boards separated from one another by air/vacuum gap dielectric. The first flexible board includes a radiating patch and a foldable, collapsible, and deployable feed transition. The second flexible board includes a ground layer and a transmission line. The feed transition is adapted to deliver an RF signal to the radiating patch from the transmission line. By pressing forward the first flexible board, the feed transition folds towards the second flexible board thereby causing the first flexible board to collapse onto the second flexible board. The feed transition may be tapered. The antenna may further include an interdigital capacitor having a first multitude of metal fingers connected to the radiating patch and a second multitude of metal fingers connected to the tapered section of the feed transition.

48 Claims, 21 Drawing Sheets

(51) Int. Cl.

*H01Q 1/48* (2006.01)
*H01Q 21/00* (2006.01)
*H01Q 21/06* (2006.01)

(52) U.S. Cl.

CPC ..... *H01Q 21/0025* (2013.01); *H01Q 21/0087* (2013.01); *H01Q 21/065* (2013.01)

(58) Field of Classification Search

CPC .. H01Q 15/161–165; H01Q 7/02; H01Q 1/08; H05K 1/147

See application file for complete search history.

(56) References Cited

U.S. PATENT DOCUMENTS

| | | | | |
|---|---|---|---|---|
| 2004/0196190 | A1* | 10/2004 | Mendolia | H01Q 9/0407 343/846 |
| 2005/0264448 | A1* | 12/2005 | Cox | H01Q 1/085 343/700 MS |
| 2007/0296634 | A1* | 12/2007 | Popugaev | H01Q 5/378 343/700 MS |
| 2008/0129453 | A1 | 6/2008 | Shanks et al. | |
| 2009/0002916 | A1 | 1/2009 | Wei et al. | |
| 2010/0231325 | A1* | 9/2010 | Hauhe | H01P 1/12 343/820 |
| 2010/0231479 | A1* | 9/2010 | Hauhe | H01Q 3/46 343/810 |
| 2012/0119954 | A1* | 5/2012 | Chen | H01Q 21/0075 343/700 MS |
| 2013/0314283 | A1 | 11/2013 | Hong et al. | |
| 2014/0285393 | A1 | 9/2014 | Biglarbegian et al. | |
| 2016/0226154 | A1 | 8/2016 | Chang et al. | |
| 2019/0393602 | A1* | 12/2019 | Arya | H01Q 21/0018 |
| 2020/0381843 | A1* | 12/2020 | Murata | H01Q 1/243 |
| 2022/0201861 | A1* | 6/2022 | Kim | H05K 1/0237 |

OTHER PUBLICATIONS

PCT/US2020/031926 Invitation to Pay Additional Fees mailed Jul. 2, 2020.

* cited by examiner

ULTRA-LIGHT WEIGHT FLEXIBLE, COLLAPSIBLE AND DEPLOYABLE ANTENNAS AND ANTENNA ARRAYS

CROSS REFERENCE TO RELATED APPLICATIONS

The present application claims benefit under 35 USC 119 (e) of U.S. provisional Application No. 62/844,542, filed May 7, 2019, entitled "Ultra-Light Weight Flexible, Collapsible And Deployable Antennas And Antenna Arrays", the content of which is incorporated herein by reference in its entirety.

FIELD OF THE INVENTION

The present invention relates to integrated circuit antennas, antenna arrays, and more particularly to patch antennas.

BACKGROUND OF THE INVENTION

Characteristics such as weight, flexibility, and storability are important in portable systems, space-based systems, and wearable devices. Such characteristics are also critical in technology areas such as wireless communication, wireless power transfer, imaging, and sensing, many of which, whether deployed in space or on Earth, require antennas.

A well-known antenna type, commonly referred to as a patch antenna, has a low profile with a relatively simple feed mechanism. Conventional patch antennas, however, are generally rigid, relatively heavy, and have a limited impedance bandwidth (BW). For example, the thickness of the antenna has a direct impact on the antenna bandwidth and its radiation efficiency. Therefore, the thinner the antenna substrate—a desirable characteristic in light weight and flexible applications—the lower is the bandwidth and the radiation efficiency. Increasing the substrate thickness will increase the antenna bandwidth and efficiency, however, it will increase the weight of the antenna, decrease its flexibility, and lower its radiation efficiency. A need continues to exist for an improved patch antenna.

BRIEF SUMMARY OF THE INVENTION

An antenna, in accordance with one embodiment of the present invention, includes, in part, a first single layer flexible board and a second single or multi-layer flexible boards separated from one another by air dielectric. The first single layer flexible board includes, in part, a radiating patch, and a foldable, collapsible, and deployable feed transition. The second flexible board includes, in part, a ground layer (ground plane) and a transmission line to which the foldable, collapsible, and deployable feed transition is attached to deliver an RF signal to the radiating patch and serve as an anchor for collapsibility and deployment of the antenna. By pressing the first flexible board, the feed transition folds towards the second flexible board thereby causing the first flexible board to collapse onto the second flexible board In one embodiment, the second flexible board further includes, in part, a transmission line delivering the RF signal from an integrated circuit or an external source to the feed transition.

In one embodiment, the first flexible board further includes, in part an opening extending from an edge of the radiating patch towards the edge of the first board to facilitate folding, unfolding, collapsing and deployment of the antenna. In one embodiment, the ground plane, defined by the ground layer, and the transmission line are on different planes. In one embodiment, the ground plane, defined by the ground layer, and the transmission line are coplanar.

In one embodiment, the transmission line further includes, in part, a quarter-wave transmission line. In one embodiment the radiating patch further includes, in part, a plurality of insets. In one embodiment, the feed transition is tapered so as to have an increasing width along a vertical direction from the second flexible board toward the first flexible board.

In one embodiment, the antenna further includes, in part, an interdigital capacitor having a first multitude of metal fingers connected to the radiating patch and a second multitude of metal fingers connected to the tapered section of the feed transition. The tapered feed transition are adapted to deliver the RF signal to the radiating patch via the interdigital capacitor.

In one embodiment, the radiating patch is positioned so as to have a 45° rotational angel relative to the first substrate or board. The feed transition is connected to a corner of the radiating patch. In one embodiment, the feed transition is connected to an edge of the radiating patch. In one embodiment, each of a multitude of corners of the radiating patch has a cut.

In one embodiment, the radiating patch includes, in part, a multitude of symmetrically positioned cuts each extending along an entire depth of the radiating patch. In one embodiment, the cuts are square cuts. In one embodiment, the ground layer includes, in part, a multitude of cuts each extending along an entire depth of the ground layer.

In one embodiment, the radiating patch is rotated by 45° angel relative the first substrate or board. The feed transition is coupled to a first edge of the radiating patch via a first port. The first flexible board includes, in part, a second foldable feed transition coupled to a second edge of the radiating patch via a second port. The first and second edges of the radiating patch are orthogonal to one another. In one embodiment, the first and second ports are triangular ports. In one embodiment, the first and second feed transitions are independently controlled. In one embodiment, each of the first and second feed transition is tapered so that each has an increasing width along a vertical direction from the second flexible board toward the first flexible board.

In one embodiment, the antenna further includes, in part, first and second interdigital capacitors each having a first multitude of metal fingers connected to the radiating patch. A second multitude of metal fingers of the first interdigital capacitor is connected to the tapered section of the first feed transition, and a second multitude of metal fingers of the second interdigital capacitor is connected to the tapered section of the second feed transition. The first tapered feed transition is adapted to deliver the RF signal to the radiating patch via the first interdigital capacitor, and the second tapered feed transition is adapted to deliver the RF signal to the radiating patch via the second interdigital capacitor.

In one embodiment, the antenna operates by delivering the RF signal via the first feed transition to the radiating patch during a first multitude of time periods, and delivering the RF signal via the second feed transition to the radiating patch during a second multitude of time periods. The first multitude of time periods and said second multitude of time periods are non-overlapping time periods. Each of a first subset of the first multitude of time periods occurs between a pair of successive second time periods.

In one embodiment, the antenna further operates by varying a phase and an amplitude of the RF signal delivered via the first feed transition to the radiating patch, and varying a phase and an amplitude of the RF signal delivered via the second feed transition to the radiating patch. In one embodiment, the first and second flexible boards include, in part, polyimide.

An antenna, in accordance with one embodiment of the present invention, includes, in part, first and second flexible boards separated from one another by an air dielectric. The first flexible board includes, in part, a radiating patch. The second flexible board includes, in part, a transmission line and a ground layer positioned above the transmission line. The ground layer includes, in part, an opening through which the transmission line delivers, by electromagnetic coupling, a signal to be radiated by the radiating patch.

In one embodiment, the transmission line is tapered so as to have an increasingly longer width along a direction of an edge of the radiating patch. In one embodiment, the opening has a trapezoid shape. In one embodiment, the radiating patch includes, in part, a multitude of symmetrically positioned cuts each extending along an entire depth of the radiating patch. In one embodiment, the cuts are square cuts. In one embodiment, the first and second flexible boards include, in part, polyimide. In one embodiment, the transmission line is enclosed within conductive walls.

A method of forming an antenna, in accordance with one embodiment of the present invention, includes, forming a radiating patch as well as a foldable, collapsible, and deployable feed transition on a first single flexible board, and forming a ground layer and a transmission lines on a second flexible board spaced away from the first flex board by an air dielectric. The feed transition is adapted to deliver an RF signal to the radiating patch. Pressing the first flexible board causes the feed transition to fold towards the second flexible board thereby causing the first flexible board to collapse onto the second flexible board.

In one embodiment, the method further includes, in part, disposing on the second flexible board a transmission line adapted to deliver the RF signal from an integrated circuit or an external source to the feed transition. In one embodiment, the method further includes, in part, disposing on the first flexible board a transmission line adapted to receive the RF signal from the feed transition and deliver the received RF signal to the radiating patch.

In one embodiment, the method further includes, in part, forming an opening extending from an edge of the radiating patch towards the edge of the first board to facilitate folding, unfolding, collapsing and deployment of the antenna. In one embodiment, the ground plane, defined by the ground layer, and the transmission line are on different planes. In one embodiment, the ground plane, defined by the ground layer, and the transmission line are coplanar. The transmission line comprises a quarter-wave transmission line.

In one embodiment, the radiating patch includes, in part, a multitude of insets. In one embodiment, the feed transition is tapered so as to have an increasing width along a vertical direction from the second flexible board toward the first flexible board. In one embodiment, the method further includes, in part, disposing an interdigital capacitor having a first multitude of metal fingers connected to the radiating patch and a second multitude of metal fingers connected to the tapered section of the feed transition. The tapered feed transition is adapted to deliver the RF signal to the radiating patch via the interdigital capacitor.

In one embodiment, the method further includes, in part, positioning the radiating patch so that the radiating patch has a 45° rotational angel relative to the first substrate or the first board, and connecting the feed transition to a corner of the radiating patch. In one embodiment, the method further includes, in part, connecting the feed transition to an edge of the radiating patch. In one embodiment, each of a multitude of corners of the radiating patch has a cut.

In one embodiment, the method further includes, in part, forming, in the radiating patch, a multitude of symmetrically positioned cuts each extending along an entire depth of the radiating patch. In one embodiment, each cut is a square cuts. In one embodiment, the method further includes, in part, forming, in the ground layer, a multitude of cuts each extending along an entire depth of the ground layer.

In one embodiment, the method further includes, in part, rotating the radiating patch by 45° angel relative the first board or substrate connecting the feed transition to a first edge of the radiating patch via a first port, and connecting a second foldable feed transition disposed on the second flexible board to a second edge of the radiating patch via a second port. The first and second edges of the radiating patch are orthogonal to one another. It is understood that a multi-layer flex board includes multiple metal layers and multiple dielectric substrate layers, and a single-layer flex board includes one dielectric substrate layer with metal layer on both sides or only on one side of it.

In one embodiment, the first and second ports are triangular ports. In one embodiment, the method further includes, in part, controlling the first feed transition independently from the second feed transition. In one embodiment, the method further includes, in part, tapering each of the first and second feed transition so that each has an increasing width along a vertical direction from the second flexible board toward the first flexible board.

In one embodiment, the method further includes, in part, forming first and second interdigital capacitors each having a first multitude of metal fingers connected to the radiating patch, connecting a second multitude of metal fingers of the first interdigital capacitor to the tapered section of the first feed transition, connecting a second multitude of metal fingers of the second interdigital capacitor to the tapered section of the second feed transition, delivering the RF signal from the first tapered feed transition to the radiating patch via the first interdigital capacitor, and delivering the RF signal from the second tapered feed transition to the radiating patch via the second interdigital capacitor.

In one embodiment, the method further includes, in part, delivering the RF signal via the first feed transition to the radiating patch during a first multitude of time periods, delivering the RF signal via the second feed transition to the radiating patch during a second multitude of time periods. The first multitude of time periods and second multitude of time periods are non-overlapping time periods. Each of a first subset of the first multitude of time periods occurs between a pair of successive second time periods.

In one embodiment, the method further includes, in part, varying a phase and an amplitude of the RF signal delivered via the first feed transition to the radiating patch, and varying a phase and an amplitude of the RF signal delivered via the second feed transition to the radiating patch. In one embodiment, the first and second flexible boards include, in part, polyimide.

A method of forming an antenna, in accordance with one embodiment of the present invention, includes, in part, forming a radiating patch on a first flexible board, and forming a transmission line and a ground layer on a second flexible board spaced away from the first board by air dielectric. The ground layer is positioned above the transmission line and includes an opening through which the transmission line delivers, by electromagnetic coupling, a signal to be radiated by the radiating patch.

In one embodiment, the method further includes, in part, tapering the transmission line so that the transmission line has an increasingly longer width along a direction of an edge of the radiating patch. In one embodiment, the opening has a trapezoid shape. In one embodiment, the method further includes, in part, forming a multitude of symmetrically positioned cuts in the radiating patch. Each cut extends along an entire depth of the radiating patch. In one embodiment, the cuts are square cuts. In one embodiment, the first and second flexible boards include, in part, polyimide. In one embodiment, the method further includes, in part, enclosing the transmission within conductive walls.

DETAILED DESCRIPTION OF THE INVENTION

A high-performance antenna, in accordance with one embodiment of the present invention, is ultra-lightweight, flexible, collapsible (foldable), deployable, rollable and has an air/vacuum gap dielectric. The antenna thus benefits from such characteristics as ease of storage, transportation and portability. The antenna may be used in an array adapted to achieve electronic beam-scanning with wide scan angles and fast scanning speed. The antenna is further capable of tolerating mechanical distortion while maintaining its bandwidth, radiation efficiency and other performance characteristics.

The antenna includes, in part, a pair of thin flexible (flex) boards separated from one another by air, or by vacuum when deployed in space. The gap height between the two boards is substantially larger than the thickness of the two flex layers. The first flex board includes, in part, the radiating elements and is alternatively referred to herein as the radiating layer. The second flex layer, which can be a multi-layer flex board, includes, in part, the feed transmission-lines (TLs), antenna and TLs ground plane, and the supporting circuitry, is alternatively referred to herein as the base flex board. The signal may be transferred from the base flex board to the radiating layer using any number of signal routing and feeding mechanisms, or by using electromagnetic couplings.

Figure 1A:
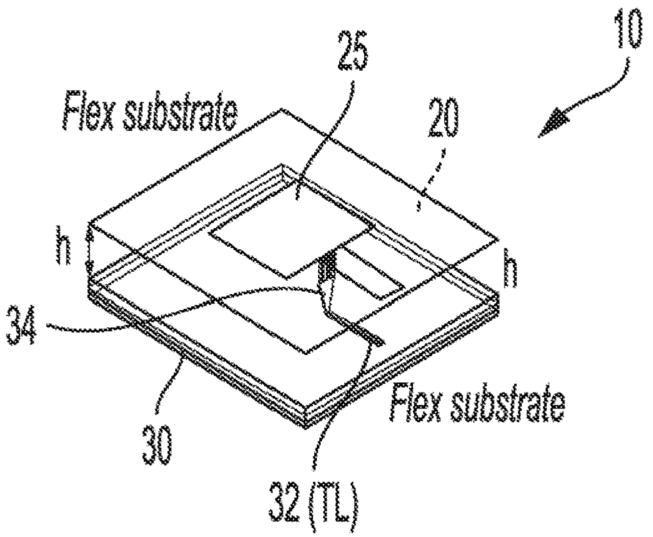
FIG. 1A is a perspective view of an antenna, in accordance with one embodiment of the present invention.

FIG. 1A is a perspective view of an antenna 10, in accordance with one embodiment of the present invention, in a deployed mode. Antenna 10 is shown, as including, in part, a radiating layer formed on a first single-layer flexible board 20, and a second flexible board 30 . The first and second flex boards are separated from one another by air or vacuum gap and spaced apart by a distance (or height) h. The radiating layer, in turn, is shown as including a patch radiator 25. The base flex board is shown as including, in part, a microstrip transmission line 32 that is coupled to patch radiator 25 via feed transition 34.

Figure 1B:
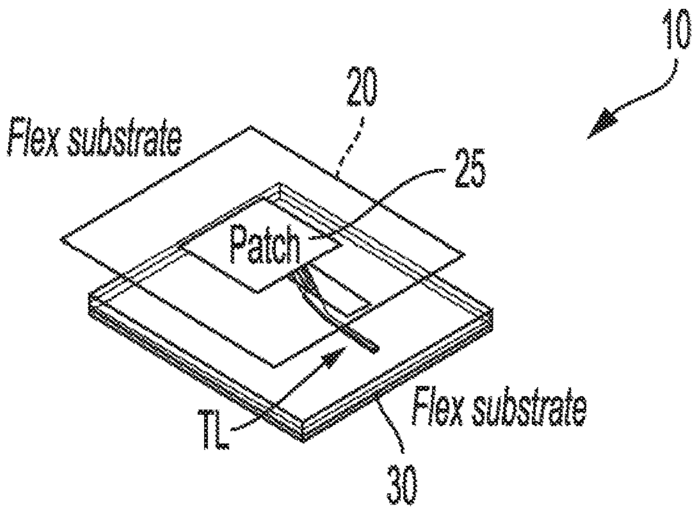
FIG. 1B shows the antenna of FIG. 1A after its radiation layer board is pushed forward in preparation to position the antenna for a collapsed state, in accordance with one embodiment of the present invention.
Figure 1C:
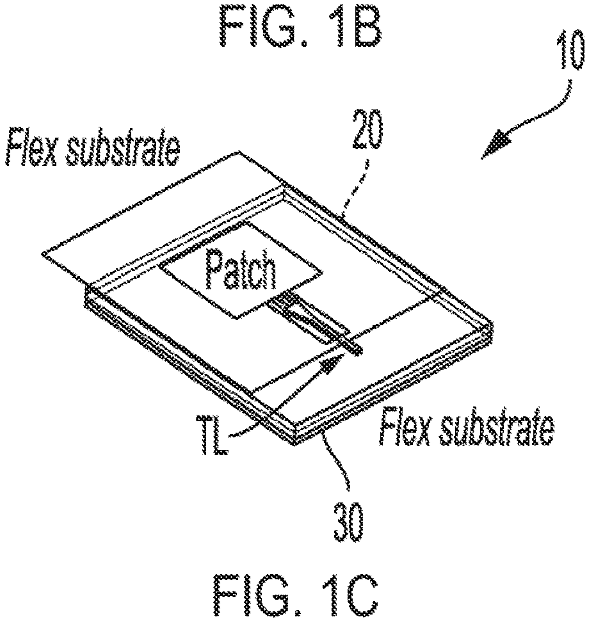
FIG. 1C shows the antenna of FIG. 1A in a fully collapsed state, in accordance with one embodiment of the present invention.

FIG. 1B shows antenna 10 after the radiating layer is pushed forward in preparation to position the antenna in a collapsed (folded) state. FIG. 1C shows antenna 10 in a fully collapsed state. As is seen from FIGS. 1A-1C and described further below, antenna 10 is ultra-lightweight, flexible, collapsible, deployable, and rollable to facilitate its storage and transportation, particularly when used in a large array, such as a large scale phased array.

Figure 2A:
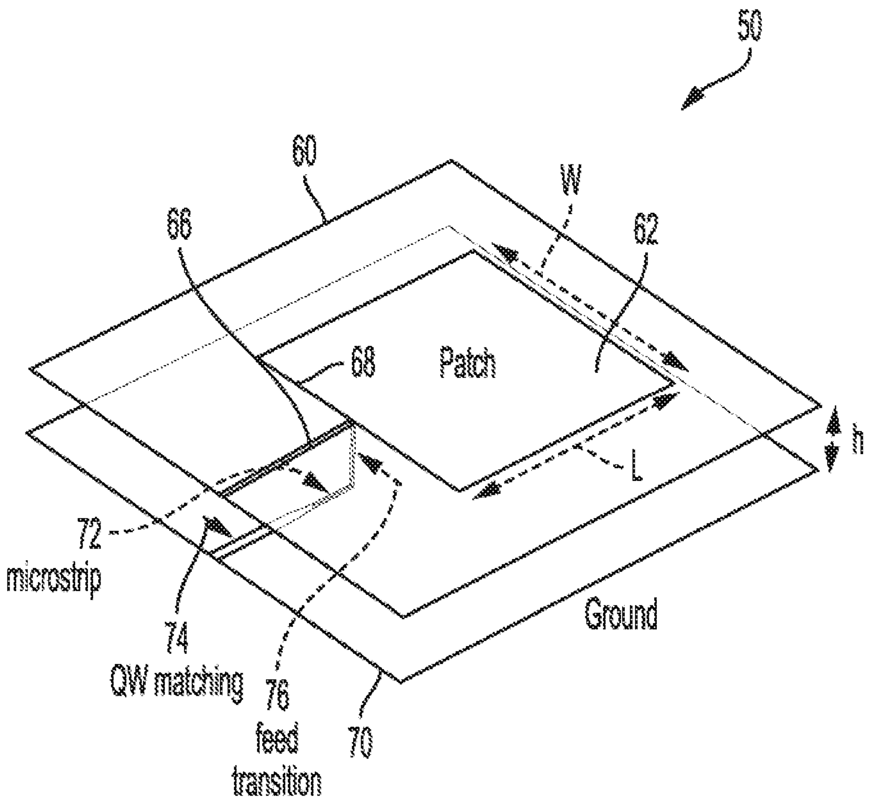
FIG. 2A is a perspective view of a linearly polarized single-feed flexible antenna, in accordance with one embodiment of the present invention.
Figure 2B:
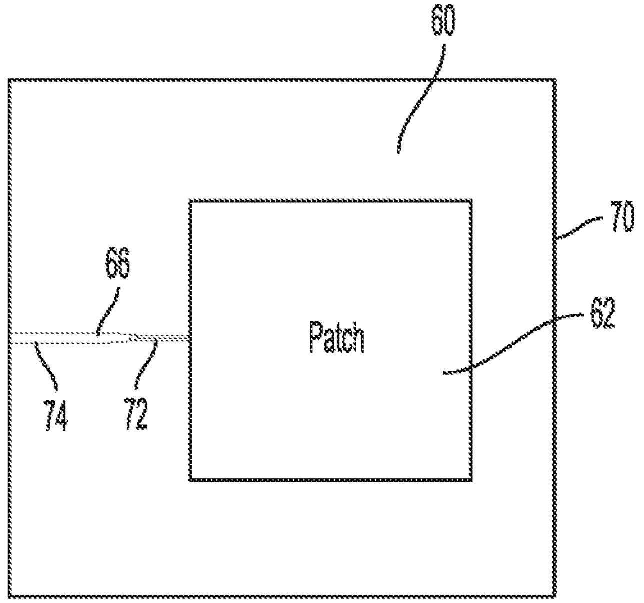
FIG. 2B is a top view of the antenna of FIG. 2A.

FIG. 2A is a perspective view of a linearly polarized single-feed flexible, collapsible, deployable, and rollable antenna 50, in accordance with one embodiment of the present invention. Antenna 50 is shown as including, in part, a first flexible board 60 and a second flexible board 70 that is spaced apart from the first flexible board by distance or height h. In one embodiment, the first and second flexible boards may be polyimide boards. FIG. 2B is a top view of antenna 50.

The first flexible board, which is a radiating layer, is shown as including, in part, a single-feed patch radiator 62 having a width W and a length L. In one embodiment, W and L are equal. Radiating layer 60 is also shown as including an opening 66 extending from edge 68 of the radiating patch to facilitate the folding and unfolding of the antenna.

The patch radiator is shown as being driven by a microstrip transmission line 72, and a quarter-wave matching transmission line 74. An s-shaped (ʃ) conductive trace 76, also referred to as a feed transition line or feed transition, transfers the RF signal from transmission line 72 to patch radiator 62 for radiation. The air filling the gap between radiating layer 60 and base flex board 70 acts as a dielectric without introducing additional loss or stiffness to the antenna while maintaining its flexibility, collapsibility, deployability, rollability (characteristics that are collectively referred to herein as FCD) and performance.

Figure 2D:
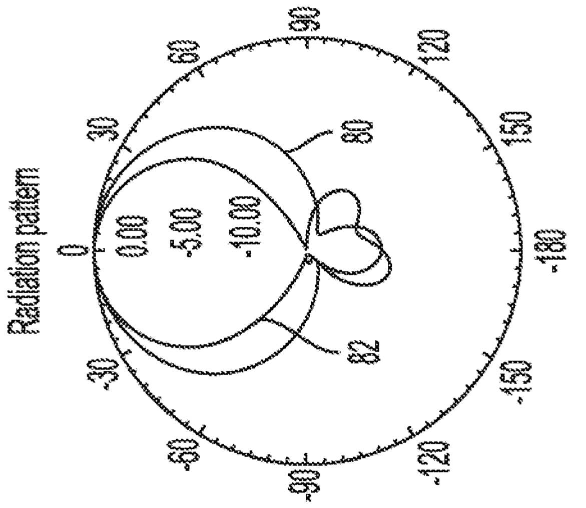
FIG. 2D shows the two-dimensional radiation pattern of the antenna of FIG. 2C along two different cuts.
Figure 2C:
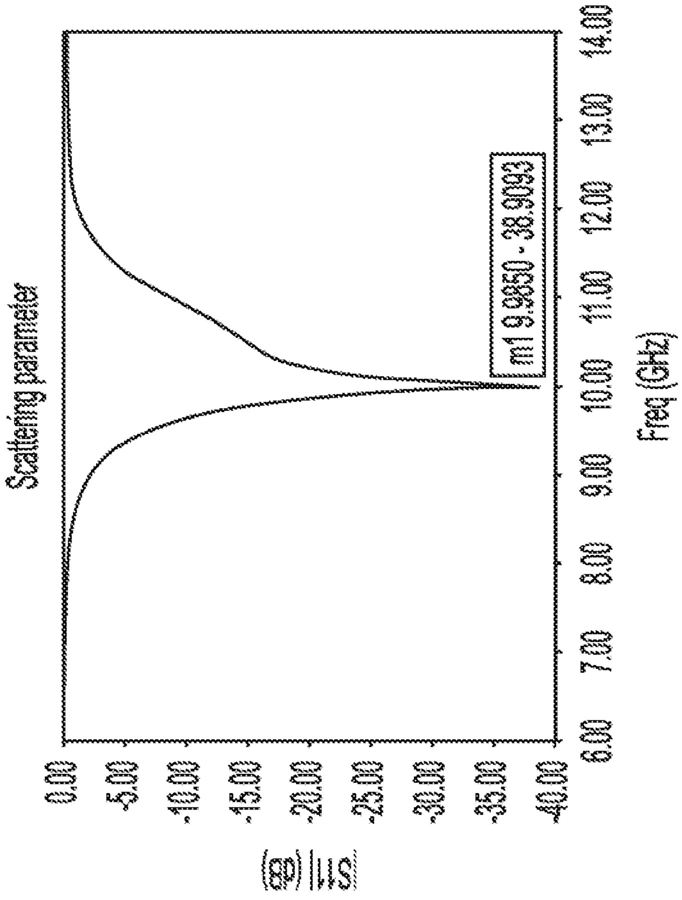
FIG. 2C shows the frequency characteristic of parameter $S_{11}$ of one exemplary embodiment of the antenna of FIG. 2A.

Furthermore, in one embodiment, by increasing the separation between the radiating layer and the base flex board, the resonant length of the antenna increases as a result of the increase in the feed transition length, thus contributing to the resonant length of the antenna and enabling the use of a smaller radiating patch area. For example, a square FCD patch antenna with a size of 11.89×11.89 $mm^2$ on a 25.4 μm thick polyimide board fed by a 50 Ω microstrip (transmission line) TL on a 50.8 μm thick polyimide board and with a feed transition length and an air-dielectric gap of 3 mm has a resonant frequency at 9.985 GHz. This resonant frequency may be seen from the frequency characteristic of parameter $S_{11}$ of this exemplary antenna as shown in FIG. 2C. Plots 80 and 82 of FIG. 2D respectively show the two-dimensional radiation pattern of the antenna at 0° and 90° cuts with respect to the plane of the patch radiator 62.

Figure 3A:
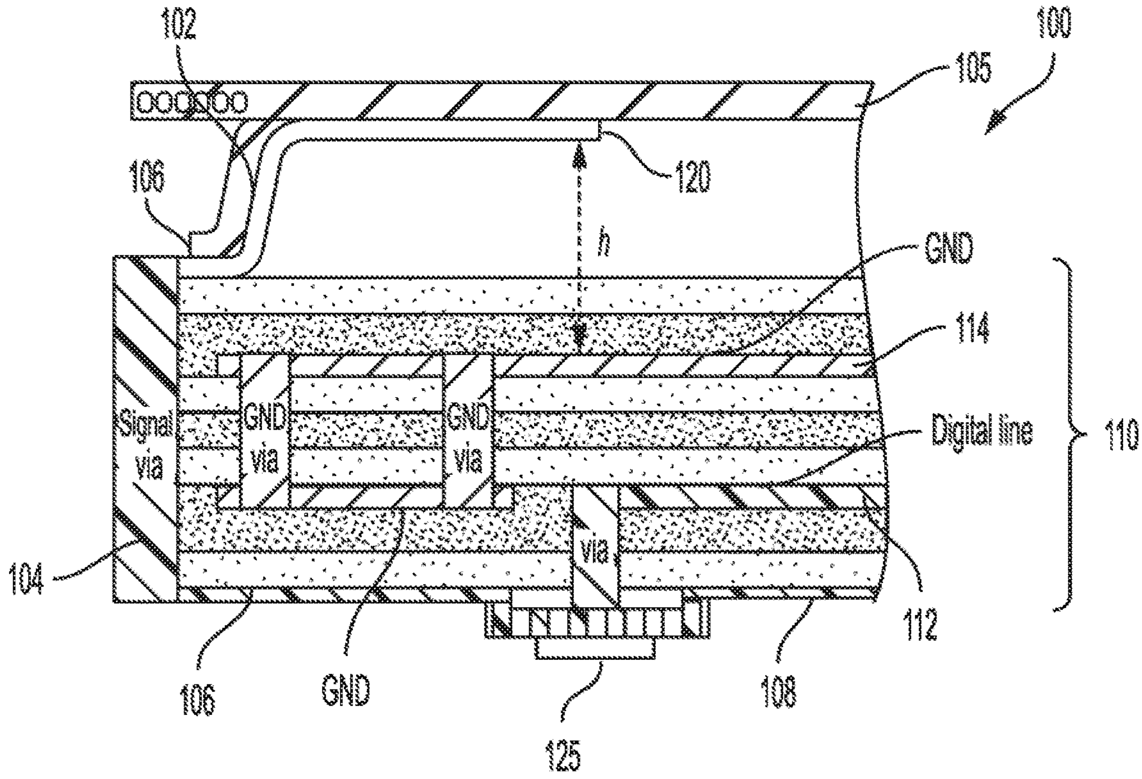
FIG. 3A is a simplified cross-sectional view of an antenna, in accordance with one embodiment of the present invention.

In some embodiments, multilayer flexible boards with multi-ground planes may be used to form the transmission lines, impedance matching network and the other supporting circuitry. FIG. 3A is a simplified cross-sectional view of an antenna 100, in accordance with one embodiment of the present invention. Flexible board 105 forms the radiation layer and is adapted to include patch radiator 120. A multilayer flexible board 110, forming the base flex board, is adapted to receive integrated circuit (IC) 125 that generates the RF signal adapted to be radiated by antenna 100. The supply voltage is supplied to IC 125 via metal line 108. The input/output signals of IC 125 are collectively shown as signal line 112. Transmission line 106, a substantial portion of which is formed on bottom side of board 110, is adapted to receive the RF signal from IC 125 and deliver the signal to patch radiator 120 through via 104—formed in the multilayer board 110—and the S-shaped feed transition 102. The height between radiator patch 120 and ground plane 114 is shown as being equal to h.

Figure 3B:
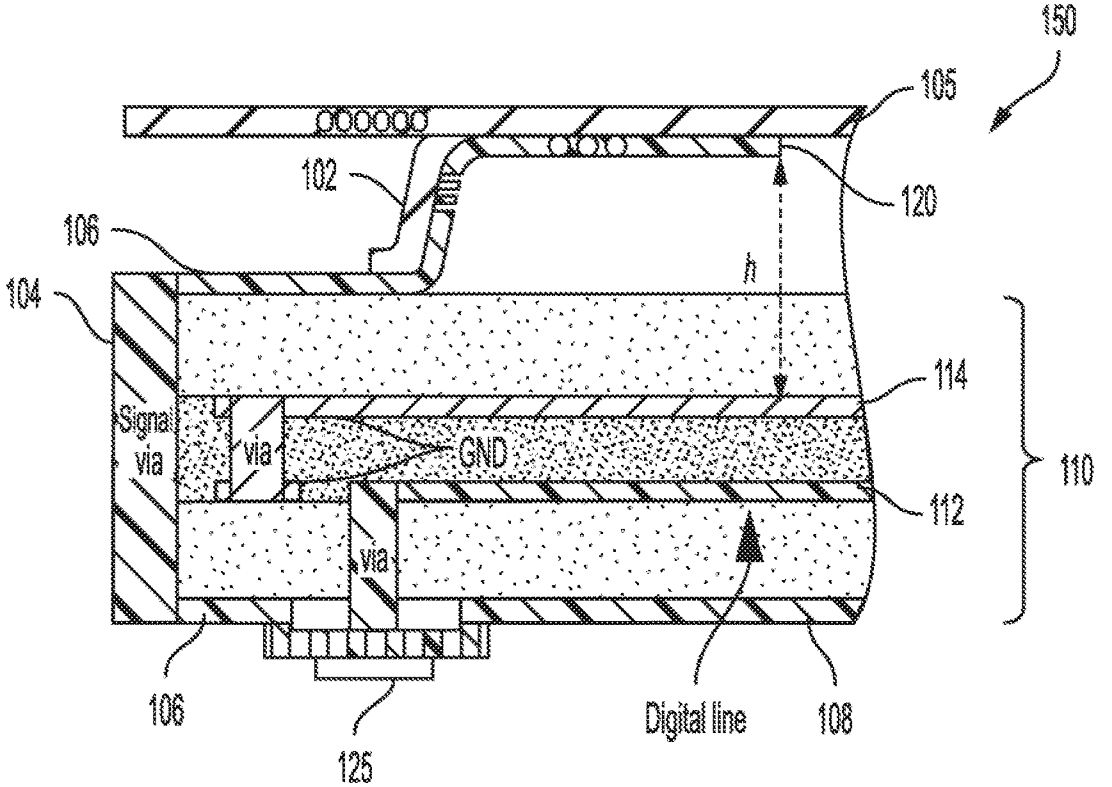
FIG. 3B is a simplified cross-sectional view of an antenna, in accordance with one embodiment of the present invention.

FIG. 3B is a simplified cross-sectional view of an antenna 150, in accordance with another embodiment of the present invention. Antenna 150 is similar to antenna 100 except that in antenna 150 a substantial portion of transmission line 106 is formed on the top surface of flexible board 110. It is understood that an antenna, in accordance with embodiments of the present invention, is not limited by the number of layers forming the base flex board 110, the ground plane configuration, and the like.

A number of different techniques may be used to achieve impedance matching for an FCD antenna, in accordance with embodiments of the present invention. In accordance with the first technique, the feed transition is connected to one of the radiating edges of the radiating patch, and a quarter-wave (QW, $l=\lambda/4$, where l is the length of the transmission line and $\lambda$ is the wavelength of the signal being transmitted) transformer impedance matching network is connected to the transmission line disposed on the base flex board. Referring to FIG. 2A (also see FIG. 3A), feed transition line 76 connected to edge 68 of patch radiator (also referred to herein as radiating patch or patch) together with QW transmission line 74 are adapted to provide impedance matching, for example, at 50 Ω at X-band.

In accordance with a second technique, an inset feed is used to move the feed transition connection to an optimum location on the patch radiator. To achieve this, in one embodiment, two relatively small cuts are formed in the edge of the patch to which the feed transition is connected. The length of the cuts is the same as the required inset length. Accordingly, the feed transition is, in effect, extended by the inset length and tapped into the patch at the optimum location while maintaining the structural integrity, such as flexibility, collapsibility, deployability, and rollability of the antenna.

Figure 4A:
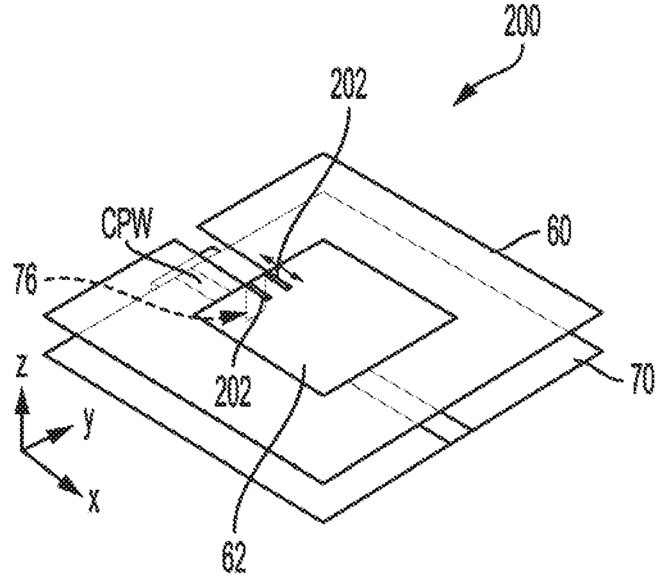
FIG. 4A is a perspective view of an antenna, in accordance with one embodiment of the present invention.

FIG. 4A is a perspective view of an FCD antenna 200, in accordance with one embodiment of the present invention. Antenna 200 is shown, as including, in part, a radiating metal patch 60 formed on a first flexible board, and a coplanar waveguide including the transmission line and ground layer formed on the flexible board 70. Radiating layer 60, in turn, is shown as including a patch radiator 62 that include insets 202.

Figure 4B:
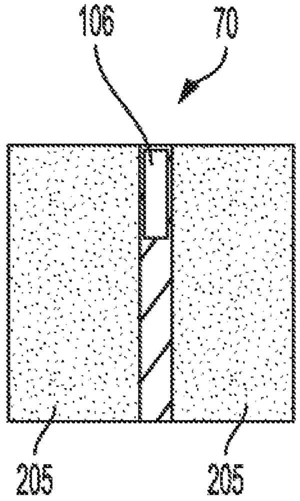
FIG. 4B is a top view of the transmission layer of the antenna of FIG. 4A.
Figure 4C:
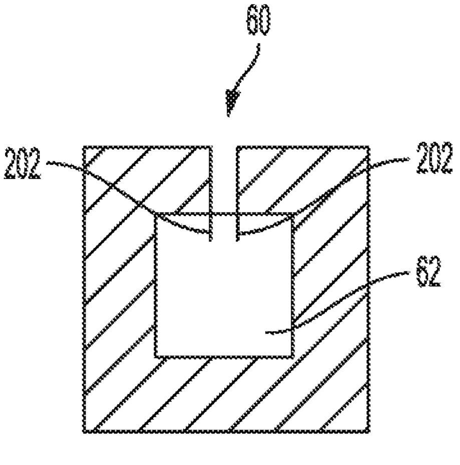
FIG. 4C is a top view of the radiation layer of the antenna of FIG. 4A.

In antenna 200, the ground plane and the transmission line are co-planar. FIG. 4B is a top view of base flex board 70 of antenna 200. Exemplary rectangular Cupper lines 205, forming the ground connection of base flex board 70, are shown as being substantially in the same plane as transmission line 106, both of which are disposed on the same flexible board. In the embodiments shown in FIGS. 3A and 3B, it is seen that the plane of the ground connectors 114 is different than that of transmission lines 106. FIG. 4C is a top view of radiating layer 60 of antenna 200. Radiator patch 62, disposed on the flexible board, is shown as including insets 202.

Figure 4E:
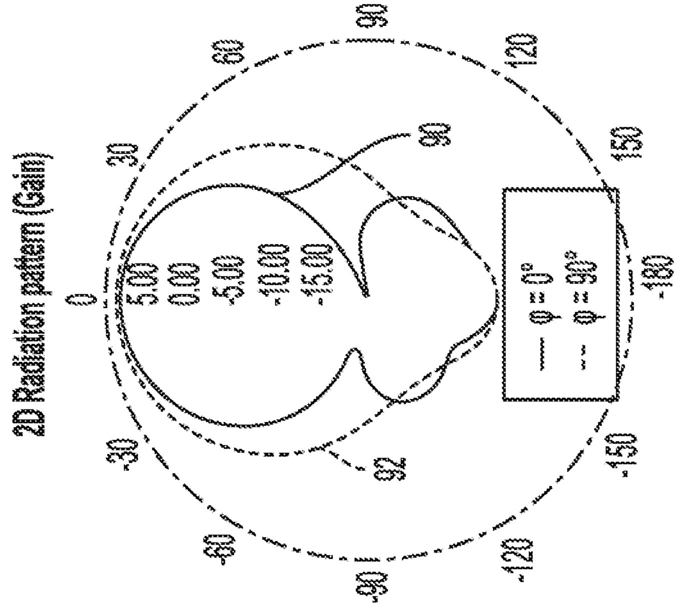
FIG. 4E shows the two-dimensional radiation pattern of the antenna of FIG. 4D along two different cuts.
Figure 4D:
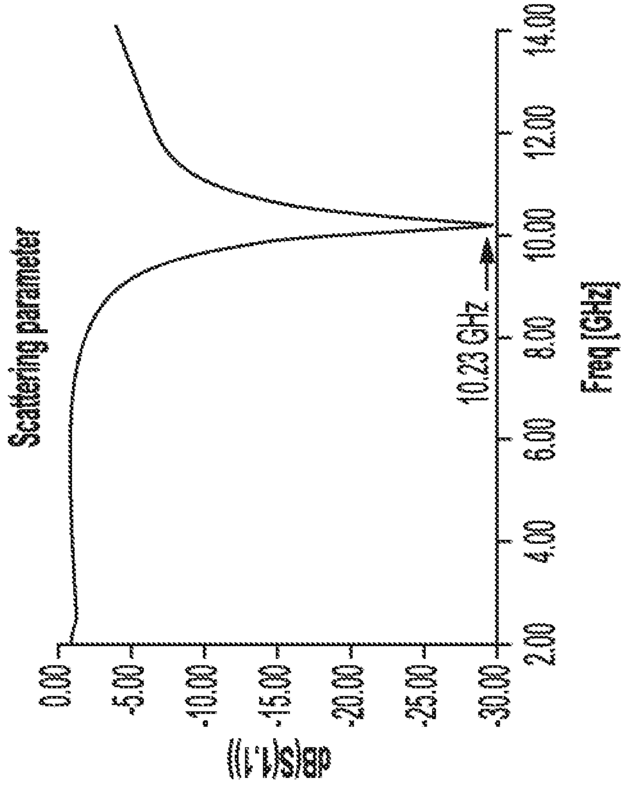
FIG. 4D shows the frequency characteristic of parameter $S_{11}$ of one exemplary embodiment of the antenna of FIG. 4A.

FIG. 4D shows the computer simulation of the frequency characteristic of parameter $S_{11}$ of an exemplary embodiment of antenna 200 according to which (a) boards 60 and 70 each have a thickness of 12.5 micrometer, (b) the spacing between the two boards is 3 mm, (c) the spacing between Cupper lines 205 is 1.892 mm, (d) the transmission line has a width of 1.384 mm, (e) the patch radiator has a square shape with each side having a length of 11.89 mm, and (f) the insets have a length of 1.475 mm each have a thickness of 12.5 micrometer as shown in FIG. 4C. Plots 90 and 92 of FIG. 4E respectively show the two-dimensional radiation pattern of the above exemplary embodiment of antenna 200 at 0° and 90° cuts with respect to the plane of the patch radiator.

In accordance with another embodiment, impedance matching is achieved by forming a feed transition that includes an interdigital capacitor and a tapered section. The patch radiator is connected to a one side of the capacitor. The tapered section and the transmission line are connected to a second side of the capacitor. Because the feed transition includes the interdigital capacitor and the tapered section, embodiments of the present invention achieve resonance impedance matching as well capacitively loading the patch radiator. The capacitive loading further reduces the patch radiator size compared to half-wavelength patches while achieving the same resonance frequency and radiation characteristic.

Figure 5A:
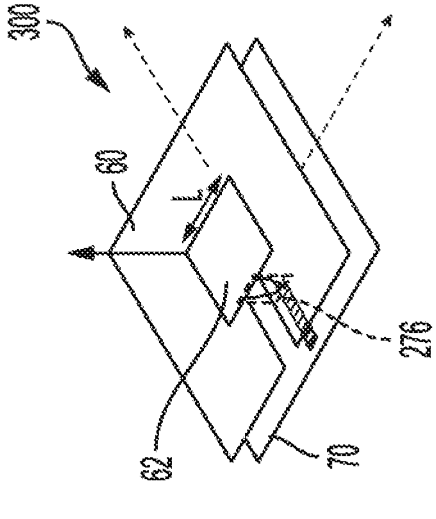
FIG. 5A is a perspective view of an antenna, in accordance with one embodiment of the present invention.
Figure 5B:
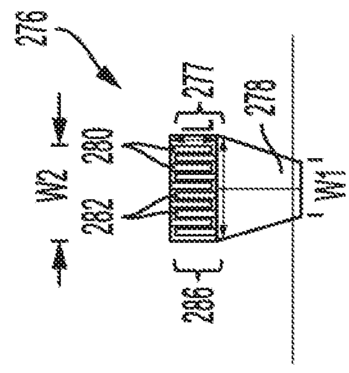
FIG. 5B is an expanded view of the tapered feed transition and the interdigital capacitor of the antenna feed of FIG. 5A.

FIG. 5A is a perspective view of an FCP antenna 300 that includes a feed transition 276. FIG. 5B is an expanded view of feed transition 276. Referring concurrently to FIGS. 5A and 5B, feed transition 276 is shown as including an interdigital capacitor 277 and a tapered section feed 278, in accordance with one embodiment of the present invention. The tapered section 278 of the feed transition 276 is configured such that its bottom width Wi (connected to the base flex board) is narrower that its top width W2 connected to the interdigital capacitor.

Metal lines 280 are arranged in an alternating manner between metal lines 282 thereby to form interdigital capacitor 286. Metal lines 280 are connected to the radiating patch 62 and metal lines 282 are connected and are part of feed transition 276. In one exemplary embodiment, metal lines 280 and 282 have the same width and the same length. In one exemplary embodiment, the spacing between each pair of adjacent metal lines 280, 282 is the same as the width of the metal lines 280 and 282.

Figure 5C:
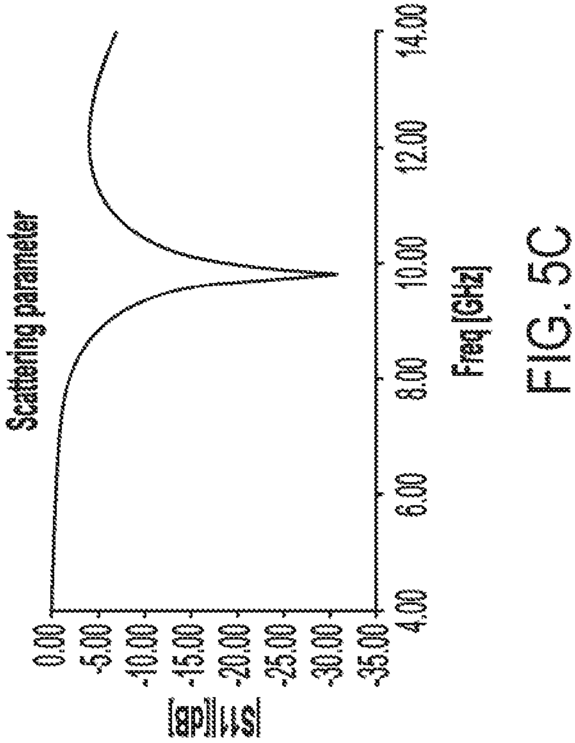
FIG. 5C shows the frequency characteristic of parameter $S_{11}$ of one exemplary embodiment of the antenna of FIG. 5A.
Figure 5D:
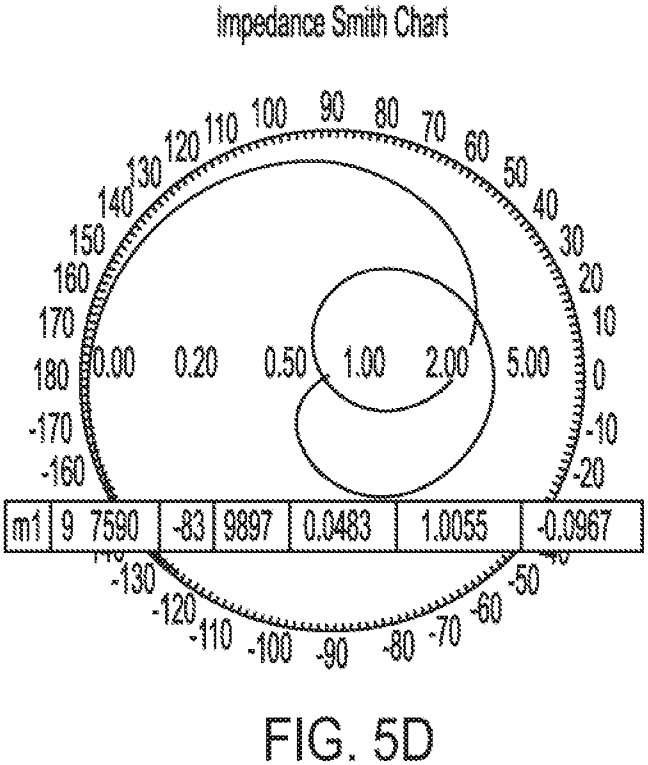
FIG. 5D shows the impedance characteristics of the antenna of FIG. 5C.
Figure 5E:
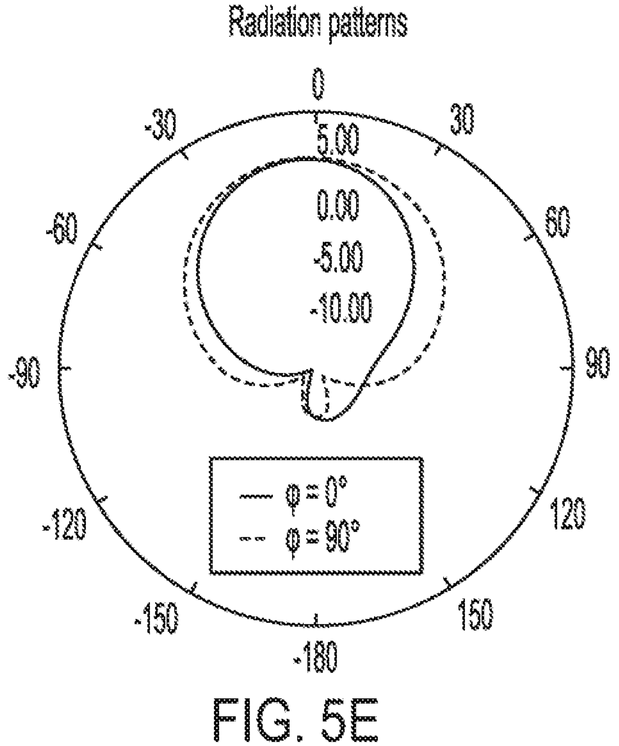
FIG. 5E shows the two-dimensional radiation pattern of the antenna of FIG. 5D along two different cuts.

FIG. 5C shows the computer simulation of the frequency characteristic of parameter $S_{11}$ of an exemplary embodiment of antenna 300 according to which (a) each of metal lines 280 and 282 has a length of 0.9 mm (b) the spacing between each pair of adjacent metal lines 280, 282 as well as the width of each such metal line is 0.1 mm, (d) and the width W2 of the tapered section of the feedline transition is 2.4 mm. In simulating FIG. 5C, the patch is selected to have a size of 9.45 mm×9.45 mm. The remaining parameters used in the simulation of FIG. 5C are similar to those described above with reference to FIGS. 4 A-4E. FIG. 5D shows the impedance of patch antenna 300 obtained under the above conditions. Plots 390 and 392 of FIG. 5E respectively show the two-dimensional radiation pattern of the above exemplary embodiment of antenna 300 at 0° and 90° cuts with respect to the plane of the patch radiator.

Figure 6A:
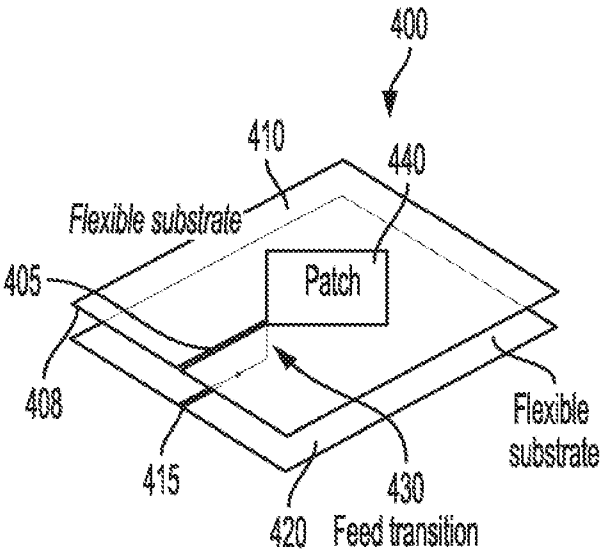
FIG. 6A is a perspective view of a single-feed circularly polarized antenna, in accordance with one embodiment of the present invention.
Figure 6B:
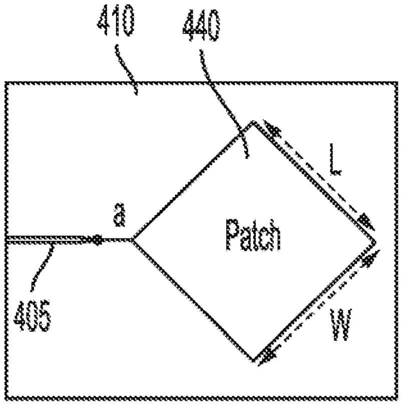
FIG. 6B is a top view of the antenna of FIG. 6A.

FIG. 6A is a perspective view of a single-feed circularly polarized FCD antenna 400, in accordance with one embodiment of the present invention. Radiating patch 440 is formed from a metal layer disposed on the single-layer flexible board 410 and has a near square geometry. Also shown is the thin opening 405 extending from corner C of the radiating patch 440 to edge 408 of board 410 to facilitate folding and unfolding of the FCD antenna. FCD antenna 400 is also shown as including, in part, a flexible board 420, and a feed transition 430 connecting transmission line 415 to radiating patch 440. As is seen from FIG. 6A, feed transition 430 is connected to corner C of radiating patch 440. As a result, the current distribution along the patch may be decomposed into two orthogonal components with almost equal amplitudes and 90° phase difference, thereby satisfying the requirement for generating radiation with circular polarization having an axial ratio smaller than 3 dB. FIG. 6B is a top view of FCD antenna 400.

Figure 7A:
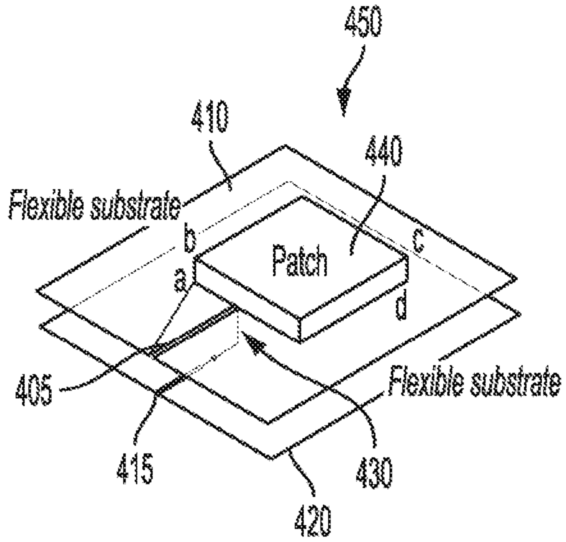
FIG. 7A is a perspective view of a single-feed circularly polarized antenna, in accordance with another embodiment of the present invention.
Figure 7B:
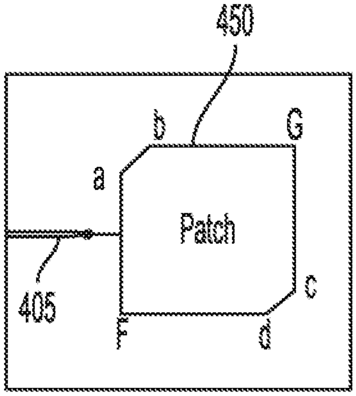
FIG. 7B is a top view of the antenna of FIG. 7A.

FIG. 7A is a perspective view of a single-feed circularly polarized FCD antenna 450, in accordance with another embodiment of the present invention. FCD antenna 450 is similar to FCD antenna 400 except that in FCD antenna 450 feed transition 430 is coupled to an edge of radiating patch 440, and further, radiating patch 440 has trimmed/cut corners. FIG. 7B is a top view of FCD antenna 450 showing a first cut corner resulting in edge ab, and a second cut corner, that is opposite to the first corner, resulting in edge cd of the patch radiator. Edges ab and cd may be parallel to a diagonal line connecting corners F and G of radiating patch 440.

Figures 8A, 8B:
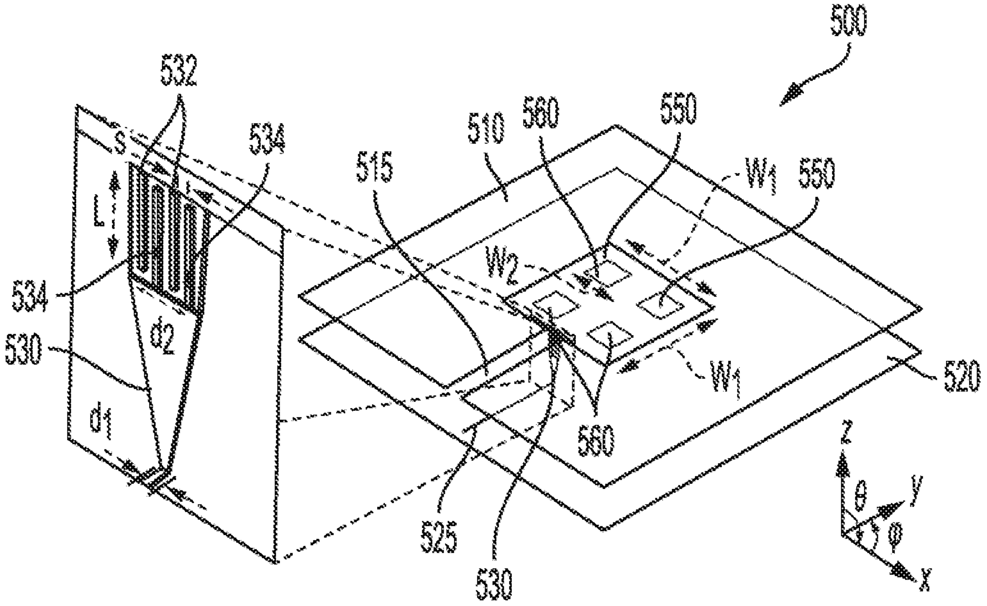
FIG. 8A is a perspective view of a fractal antenna, in accordance with one embodiment of the present invention.
FIG. 8B is an expanded view of the tapered feed transition and the interdigital capacitor of the antenna feed of FIG. 8A.

Some embodiments of an FCP antenna have a fractal-pattern geometry (alternatively referred to herein as fractal) so as to have a reduced mass. Repeating and scaled patterns may be used to enhance the bandwidth of such embodiments. FIG. 8A is a perspective view of an FCP fractal antenna 500, in accordance with one embodiment of the present invention. The base flex board 520, is shown as including, in part, transmission line 525 coupled to the tapered section of feed transition 530. Single-layer flex board 510, forming the radiation layer, is shown as including, in part, a patch radiator 550 that has a multitude of fractal-pattern cuts 550. The size and locations of such cuts are selected so as to minimally perturb the current distribution on the surface of the radiator patch.

Exemplary square patch radiator 550 has a width of $W_1$ and is shown as having four equal and symmetrically disposed square cuts 560, thus resulting in a significantly reduced mass of the radiator patch. Each square cut is shown as having a dimension of $W_2$. The radiating patch of FCD antenna 500, in addition to having a significantly reduced mass, is optically transparent and thus ideally suited for use in solar-based applications.

FIG. 8B is an expanded view of the tapered section of the feed transition 530 and the associated interdigital capacitor. The tapered section of the feed transition 530 is shown as having a width of $d_1$ along its bottom edge and a width of $d_2$ along its top edge. Metal fingers 534 (connected to feed transition 530) disposed between metal fingers 532 (connected to the patch radiator) form an interdigital capacitor thereby to achieve impedance matching and further to capacitively load the patch radiator, as described further above. Metal fingers 532 and 534 are shown as having substantially equal length L.

Figure 8C:
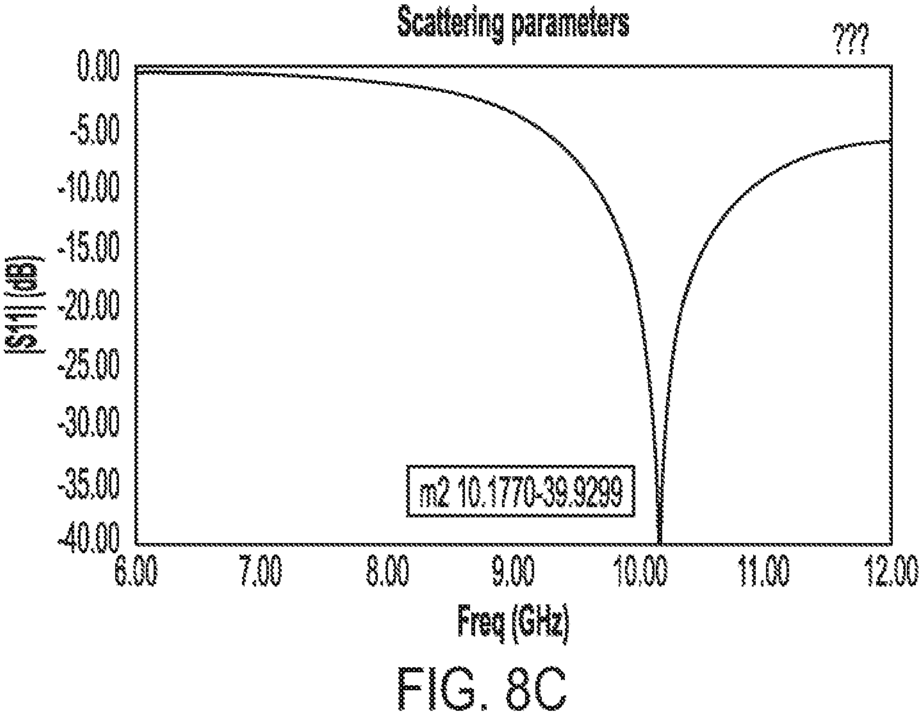
FIG. 8C shows the frequency characteristic of the scattering parameter Si1 of an exemplary embodiment of the antenna of FIG. 8A.
Figure 8D:
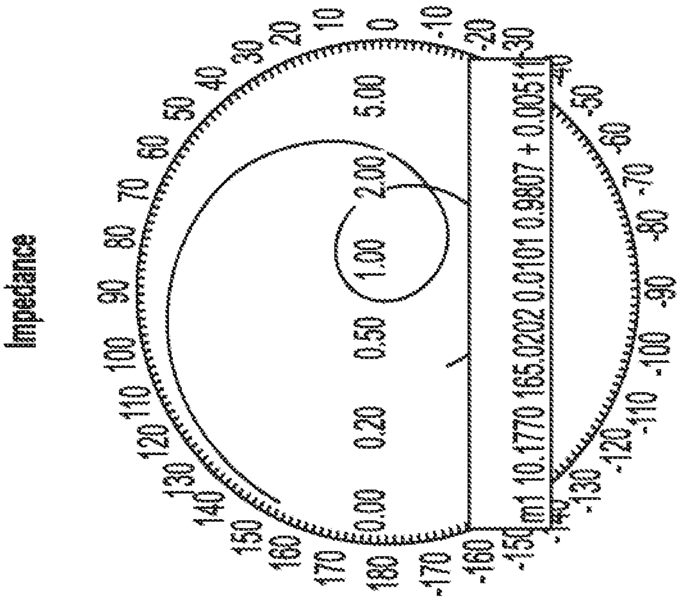
FIGS. 8D shows the impedance characteristic of the antenna of FIG. 8C.
Figure 8E:
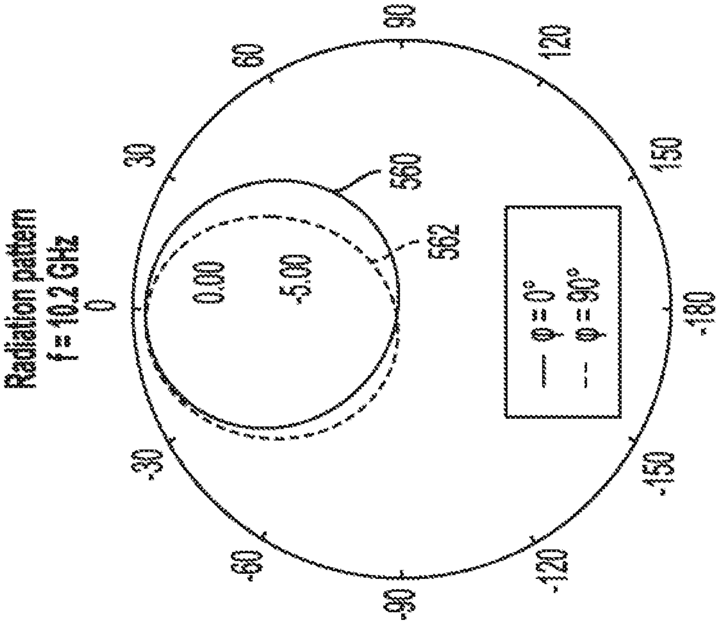
FIG. 8E shows the two-dimensional radiation pattern of the antenna of FIG. 8C along two different cuts.

FIGS. 8C, 8D and 8E respectively show the frequency characteristics of the scattering parameter $S_{11}$, the impedance and radiation pattern of an exemplary embodiment of FCP antenna 500. In this example, board 520 has a thickness of 101.6 um, board 510 has a thickness of 25.4 um, the gap between boards 510 ad 520 is 3 mm, radiator patch 550 has a width $W_1$ of 9 mm, each of the four square cuts 560 has a width $W_2$ of 2.3 mm, the bottom width $d_1$ of the feedline transition is 99 μm, the top width $d_2$ of the feedline transition is 0.9 mm, the width of each metal finger 532 and 534 and as well as the spacing between each adjacent pair of metal fingers 532 and 534 is 0.1 mm, and the length of each of metal fingers 532 and 534 is 1.1 mm. As is seen from the Figures, the antenna is designed to operate in the X-band with a resonant frequency at 10.2 GHz with an operation impedance of 75 Ω. Microstrip transmission line 525 is selected to have an impedance of 75Ω which together with the tapered feed transition 530 and the capacitive coupling achieve impedance matching. Plots 560 and 562 of FIG. 8E respectively show the two-dimensional radiation pattern of the above exemplary embodiment of antenna 500 at 0° and 90° cuts with respect to the plane of the patch radiator.

An FCD antenna, in accordance with some embodiments, has a meshed ground plane to further reduce the mass of the antenna. The meshed plane may be formed by removing an array of, for example, square cuts from the ground plane (or plates) of the base flex board. The size(s) of the square cuts and their periodicity are selected in a sub-wavelength range such that at the RF operation frequencies, the ground plane is in effect homogenous without disturbing the current return path and without substantially affecting the antenna performance characteristics such as its return loss, resonant frequency, radiation pattern shape, antenna gain, radiation efficiency, and the like.

Meshing the ground plane, among other advantages, (i) reduces the mass density of the ground plane and thus the overall area mass of the antenna and (ii) renders the antenna usable as a transparent conductor at optical frequencies, thus enabling the integration of the antenna and the RF component with photovoltaic cells in solar-based applications. It is understood that a meshed ground plane may be used with any of the embodiments of an FCD antenna described herein.

Figure 9A:
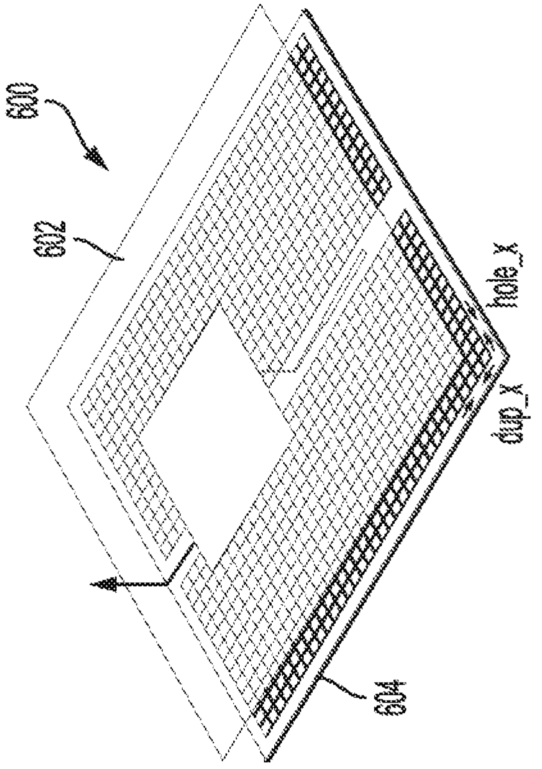
FIG. 9A is a perspective view of a linearly polarized single-feed antenna, in accordance with one embodiment of the present invention.
Figure 9B:
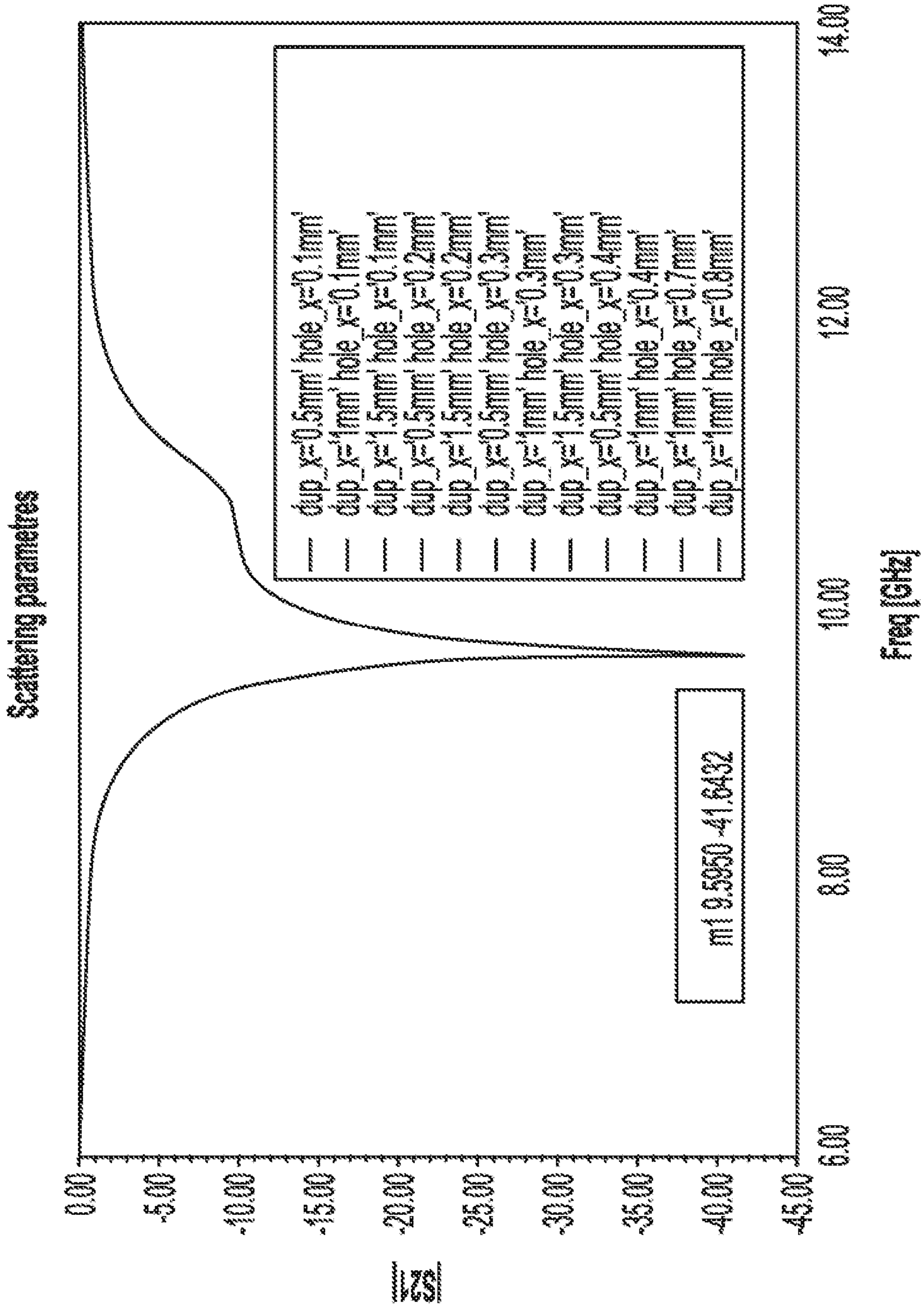
FIG. 9B shows the frequency characteristic of the scattering parameter of the antenna of FIG. 9A.

FIG. 9A is a perspective view of a linearly polarized single-feed FCD square patch antenna 600 having a radiation layer 602, and a meshed ground plane disposed on flexible board 604, in accordance with one embodiment of the present invention. Each square cut in the ground plane of the base flex board is shown as having a length hole_x. The spacing between each pair of adjacent cuts is shown as being equal to dup_x. FIG. 9B shows that the frequency characteristics of the scattering parameter $S_{11}$ of patch antenna 600 are substantially the same for different values of hole_x and dup_x.

Figure 10A:
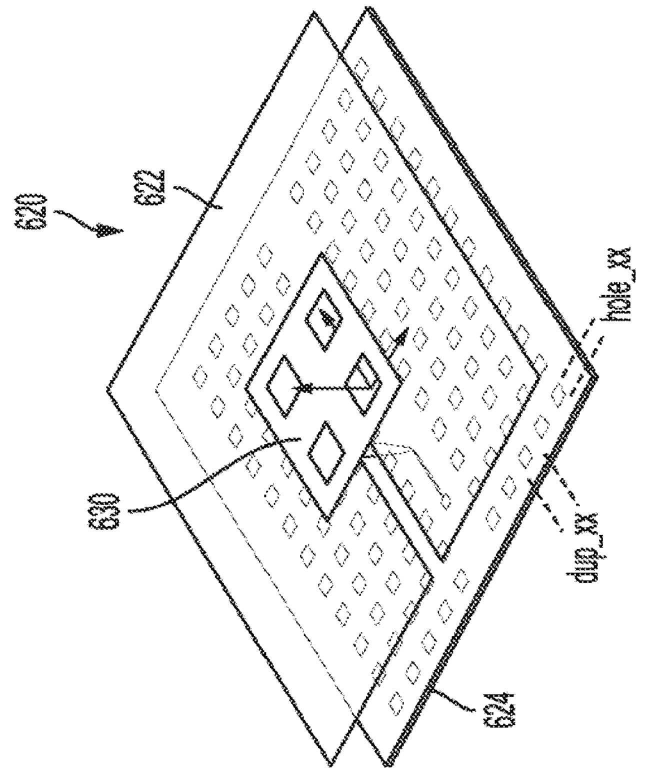
FIG. 10A is a perspective view of a linearly polarized single-feed antenna, in accordance with one embodiment of the present invention.
Figure 10B:
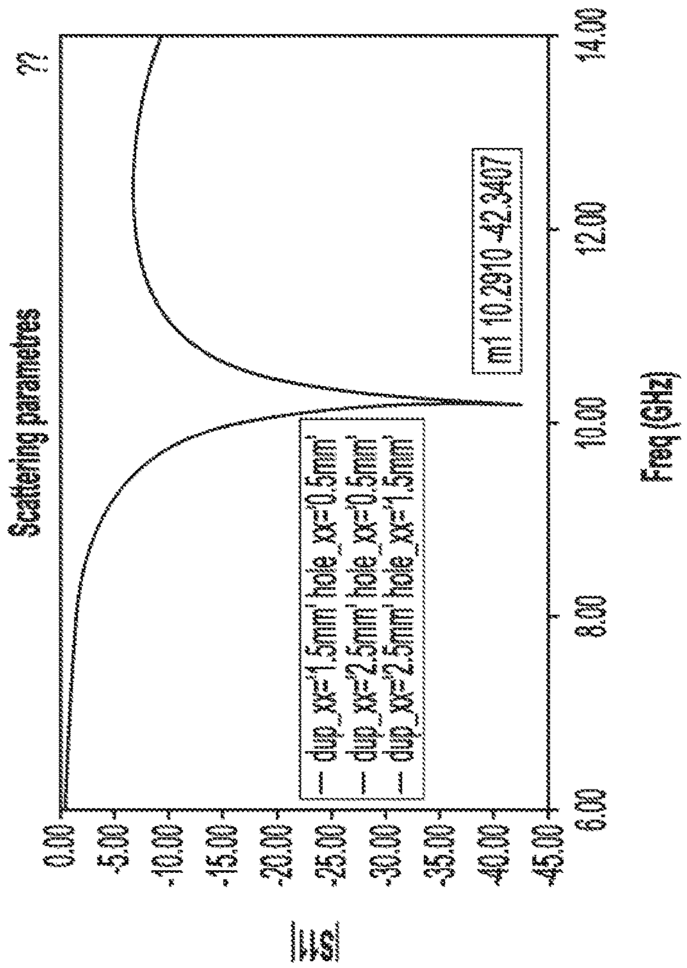
FIG. 10B shows the frequency characteristics of the scattering parameter of the antenna of FIG. 10A.
Figures 10C, 10D:
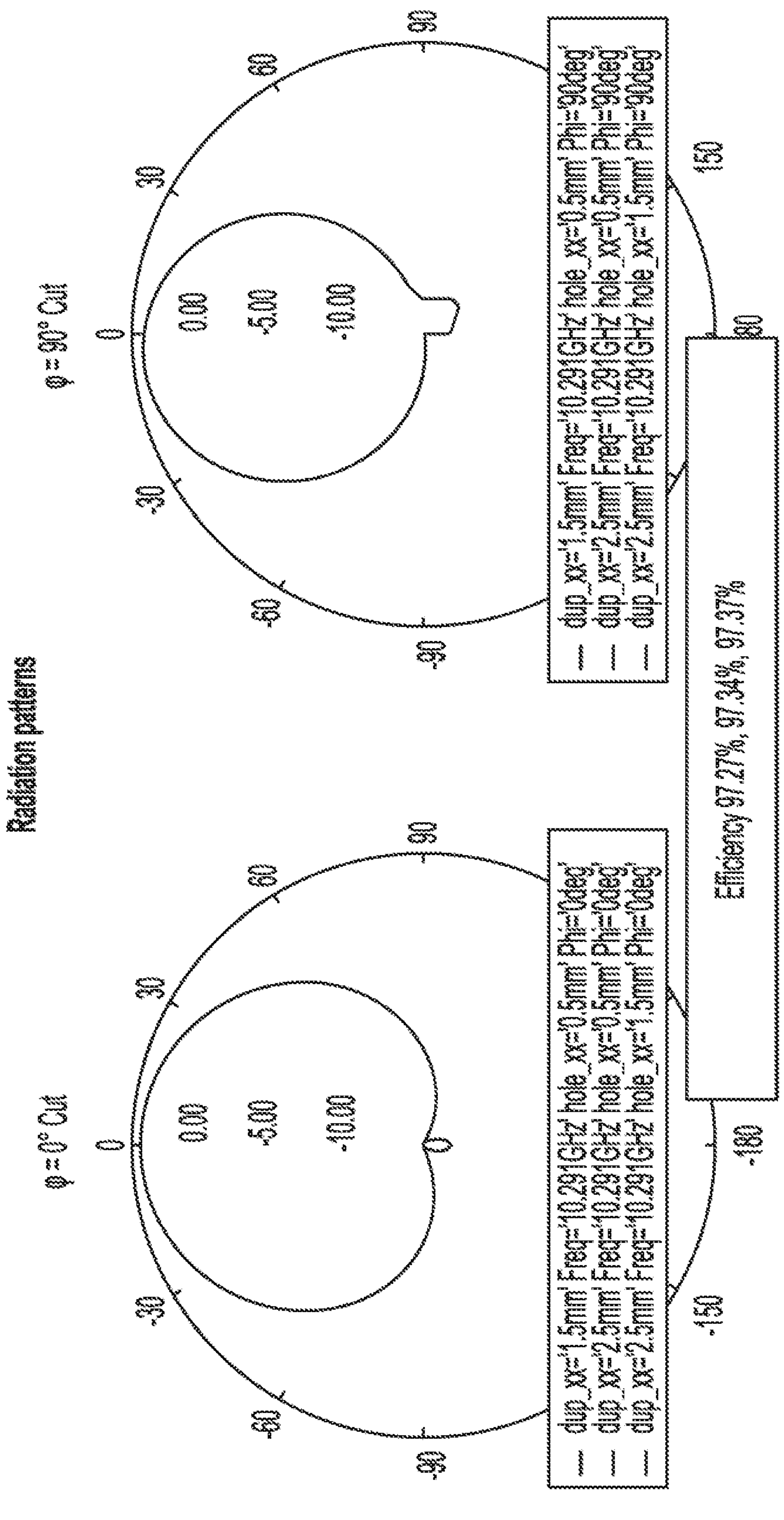
FIGS. 10C and 10D respectively show the two-dimensional radiation pattern of the antenna of FIG. 10B at 0° and 90° cuts with respect to the plane of the patch radiator of the antenna

FIG. 10A is a perspective view of a linearly polarized single-feed FCD antenna 620 having, in part, a meshed ground plane 624, and a fractal radiator patch 630 disposed on radiation layer 622. Radiator patch 630 is shown as having four square cuts but it is understood that radiator patch 630 may have any number of cuts, square or otherwise, and any fractal pattern. Each square cut in the ground plane of the base flex board is shown as having a length hole xx. The spacing between each pair of adjacent cuts is shown as being equal to dup_xx. FIG. 10B shows that the frequency characteristics of the scattering parameter $S_{11}$ of patch antenna 620 for three different set of values of hole_xx and dup_xx are substantially the same. FIGS. 10C and 10D respectively show the two-dimensional radiation pattern of FCD antenna 620 at 0° and 90° cuts with respect to the plane of the patch radiator.

Figure 11A:
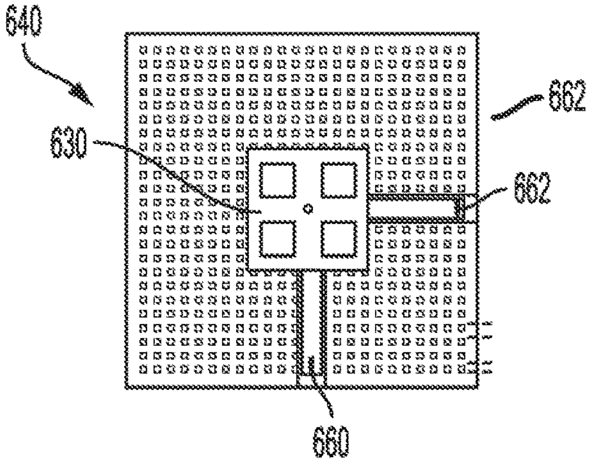
FIG. 11A is a top view of a double-feed polarization diverse antenna, in accordance with one embodiment of the present invention.
Figure 11B:
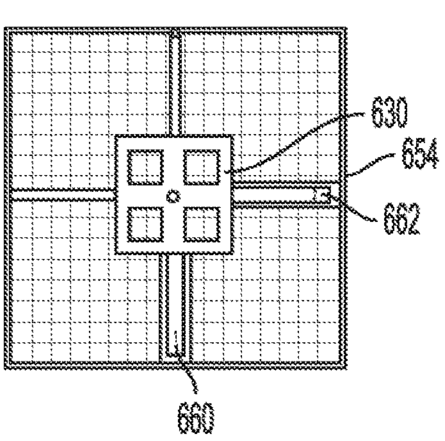
FIG. 11B is a top view of a double-feed polarization diverse antenna, in accordance with one embodiment of the present invention.

FIG. 11A is a top view of a linearly polarized double-feed FCD antenna 640 having, in part, a meshed ground plane 664, and a fractal radiator patch 630 disposed on a single-layer flex board, in accordance with one embodiment of the present invention. Radiator patch 630 is shown as being driven by two transition feeds 660 and 662. The square cuts forming the mesh in the ground plane of the base flex board are selected to have a length (identified in the Figure as hole_x) of 0.5 mm. The mesh pitch (i.e., the spacing between each pair of adjacent square cuts and identified in the Figure as dup_xx) is selected to be 1 mm. FIG. 11B is a top view of a linearly polarized double-feed FCD antenna 650, in accordance with another embodiment of the present invention. FCD antenna 650 is similar to FCD antenna 600 except that in FCD antenna 650, hole_x is 1.4 mm and dup_xx is 1.5 mm. FCD antenna 650 achieves 87% metal area reduction in its ground plane while having substantially a similar performance level as a similar FCD antenna without a mesh ground plane.

Figure 11C:
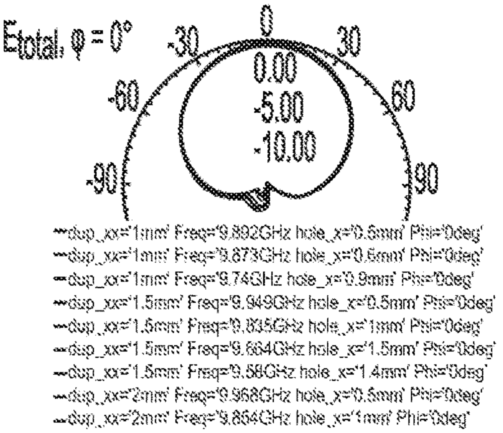
FIGS. 11C shows the two-dimensional radiation pattern of the antenna of FIG. 11C at 0° cut with respect to the plane of the patch radiator of the antenna.
Figure 11D:
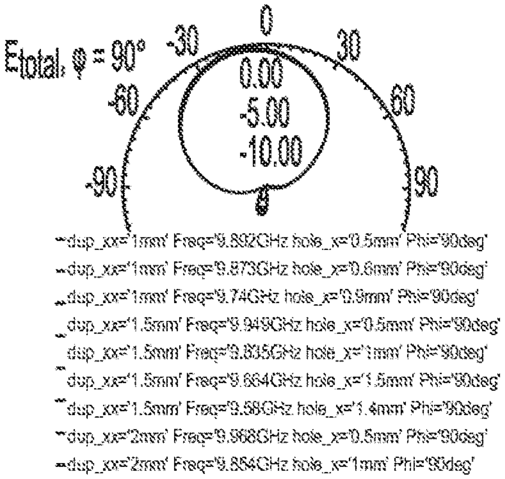
FIGS. 11D shows the two-dimensional radiation pattern of the antenna of FIG. 11C at 90° cut with respect to the plane of the patch radiator of the antenna.

FIG. 11C shows the two-dimensional radiation pattern of a linearly polarized double-feed FCD antenna at 0° cut with respect to the plane of the patch radiator for different hole_x and dup_xx parameter values. FIG. 11D shows the two-dimensional radiation pattern of a linearly polarized double-feed FCD antenna at 90° cut with respect to the plane of the patch radiator for the same hole_x and dup_xx parameter values as those shown in FIGS. 11C. Although radiator patches 630 of antennas 640 and 650 are shown as having four square cuts, it is understood that radiator patch 630 may have any number of cuts, square or otherwise, and any fractal pattern.

Figure 12A:
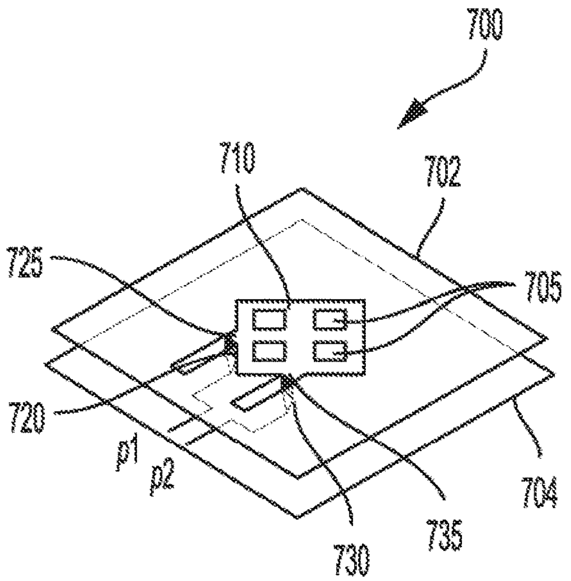
FIG. 12A is a perspective view of a dual-feed dual-polarized antenna, in accordance with one embodiment of the present invention.
Figure 12B:
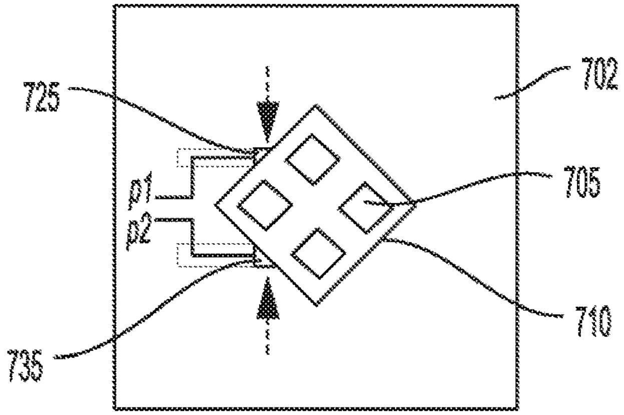
FIG. 12B is a top view of the antenna shown in FIG. 12A.
Figure 12C:
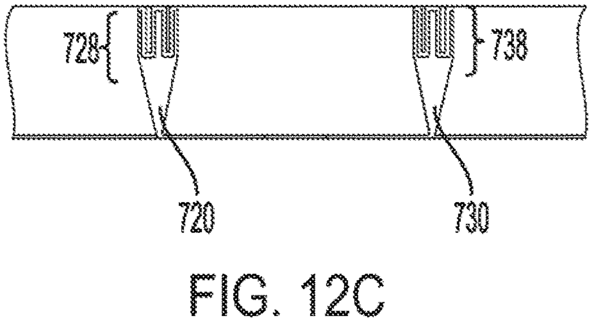
FIG. 12C is a cross-sectional view of tapered transition feeds and interdigital capacitors disposed in antenna 12A.

FIG. 12A is a perspective view of a dual-feed dual-polarized FCD antenna 700, in accordance with one embodiment of the present invention. Antenna 700 is shown, as including, in part, a base flex board 704 and a flexible radiation layer 702. Patch radiator 710 is shown as including four square cuts 705 and rotated by 45° relative to the edges of layer 702. Radiator patch 710 is coupled to transmission lines $P_1$ and $P_2$ disposed on base flex board 704 by tapered transition feeds 720 and 730, as shown. Radiator patch 710 includes triangular-shaped ports 725, 735 that connect to transition feeds 720 and 730, as shown in perspective view of FIG. 12A and top view of antenna 700 shown in FIG. 12B. FIG. 12C is a cross-sectional view of tapered transition feeds 720 and 730 that respectively include interdigital capacitors 728, and 738 more detailed views of which may be seen in interdigital capacitor 286 of FIG. 5B.

Transition feeds 720 and 730 may be independently controlled to excite the two adjacent and orthogonal edges of patch that is rotated by 45° with respect to the orientation of the transmission lines. By exciting one of the ports and terminating the other port and by switching between the excited and terminated ports, two orthogonal and linearly polarized radiation patterns are achieved. Moreover, by exciting both ports and controlling the amplitudes and phases of the two excitations, other desirable polarizations (e.g., circular, elliptical) in addition to the two linear polarizations may be attained. Such polarization diversity is achieved without degrading the collapsibility, deployability, flexibility and rollability of antenna 700.

Figure 13A:
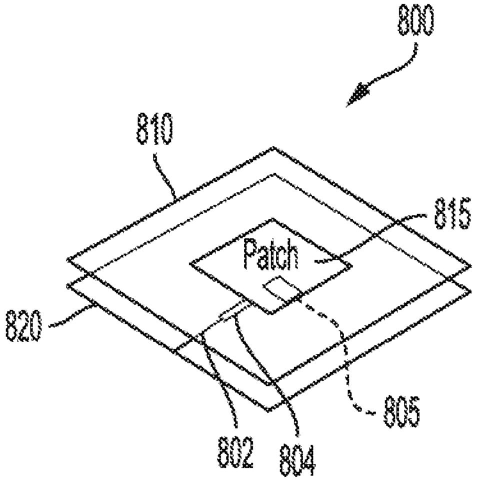
FIG. 13A is a simplified perspective view of an aperture-coupled antenna, in accordance with another embodiment of the present invention.
Figure 13B:
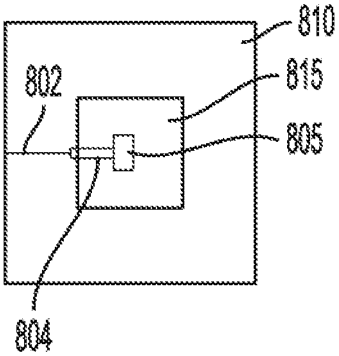
FIG. 13B is a top view of the antenna shown in FIG. 13A.

In accordance with some embodiments, the FCD antenna dispenses with the transition feeds that are otherwise required to connect the transmission line to the patch radiator. FIG. 13A is a simplified perspective view of an aperture-coupled FCD antenna 800, in accordance with another embodiment of the present invention. Antenna 800 is shown as including, in part, a flexible radiating layer 810 and a flexible board 820. Patch radiator 815 is formed on radiating layer 810. Flexible board 820 is shown as including, in part, first and second transmission line sections 802 and 804. Antenna 800 is also shown as including a cut (also referred to as slot) 805 in the ground plane of its flexible board. The signal to be radiated by patch radiator 815 is transferred, via electromagnetic waves, from the transmission lines to the patch radiator and through slot 805 cut in the ground plane. FIG. 13B is a top view of antenna 800.

Figure 13C:
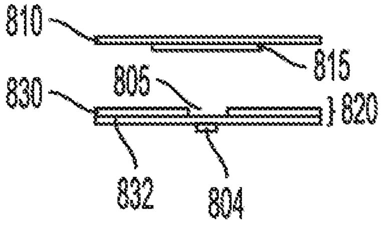
FIG. 13C is a side view of the antenna of FIG. 13A.

FIG. 13C is a side view of antenna 800. Ground plane 830, shared between the transmission line on the bottom side of flexible board 820 board and the radiating patch antenna, is disposed on top side of the flexible board 820. The RF signal generated by the IC or an external source is coupled electromagnetically from transmission line 804 and through slot 805 to patch radiator 815. The size of the slot and the width of the transmission line sections positioned below the slot are used to control the degree of coupling between the transmission line 804 and radiator patch 815. Furthermore, the location of the slot relative to the transmission line and the patch determines the location of the coupling to the patch and may be used to achieve impedance matching. Such impedance matching is achieved, in part, due to the fact that the open-ended transmission line section beyond the slot operates as an open-ended single stub matching network.

Figure 14A:
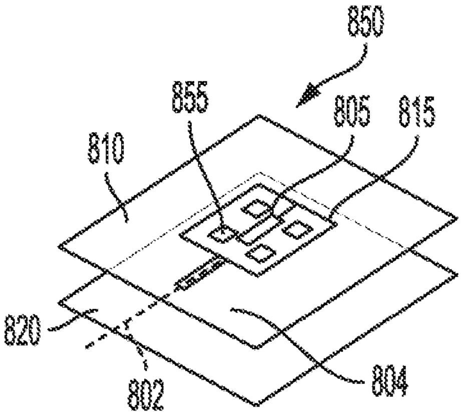
FIG. 14A is a simplified perspective view of an aperture-coupled antenna, in accordance with another embodiment of the present invention.
Figure 14B:
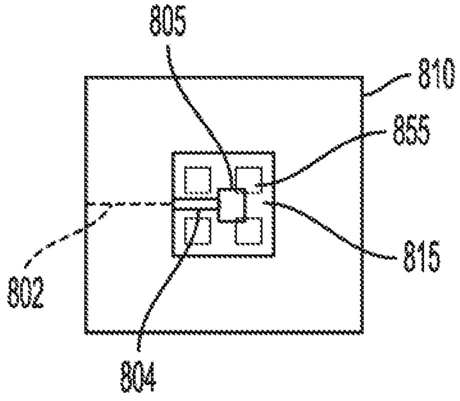
FIG. 14B is a top view of the antenna of FIG. 14A.
Figure 14C:
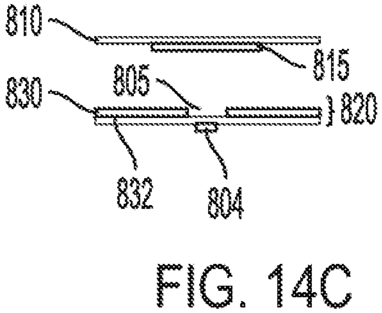
FIG. 14C is a side view of the antenna of FIG. 14A.

FIG. 14A is a simplified perspective view of an aperture-coupled FCD antenna 850, in accordance with another embodiment of the present invention. Antenna 850 is similar to antenna 800 of FIG. 13A except that in antenna 850, patch radiator 815 has cuts 855, which in the exemplary embodiment of FIG. 14A are four square cuts. FIGS. 14B and 14C are respectively top and side views of antenna 850.

Figure 15:
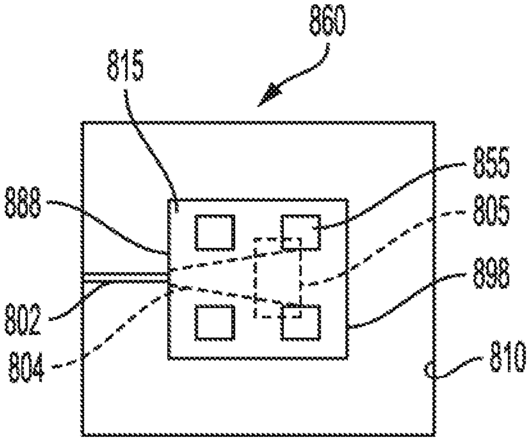
FIG. 15 is a simplified top view of an aperture-coupled antenna, in accordance with another embodiment of the present invention.

FIG. 15 is a simplified top view of an aperture-coupled FCD antenna 860, in accordance with another embodiment of the present invention. Antenna 860 is similar to antenna 850 except that in antenna 860 transmission line section 804 is tapered so as to have a longer edge facing edge 898 of patch radiator 815.

Figure 16:
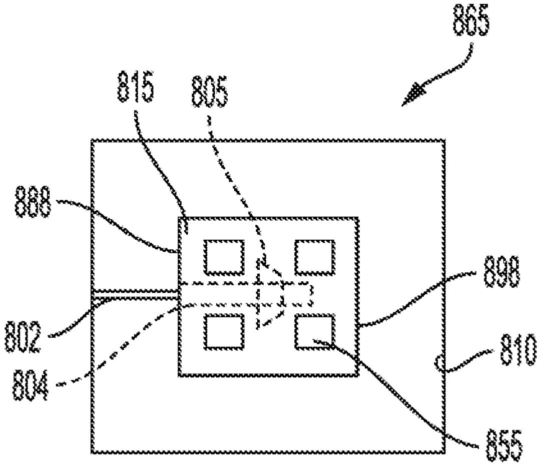
FIG. 16 is a simplified top view of an aperture-coupled antenna, in accordance with another embodiment of the present invention.

FIG. 16 is a simplified top view of an aperture-coupled FCD antenna 865, in accordance with another embodiment of the present invention. Antenna 865 is similar to antenna 850 except that in antenna 865 slot opening 805 is tapered and radial so as to have a shorter edge facing edge 898 of patch radiator 815 relative to its other edge facing edge 888 of the patch. Opening 805 may have a trapezoid and radial shape.

Figure 17:
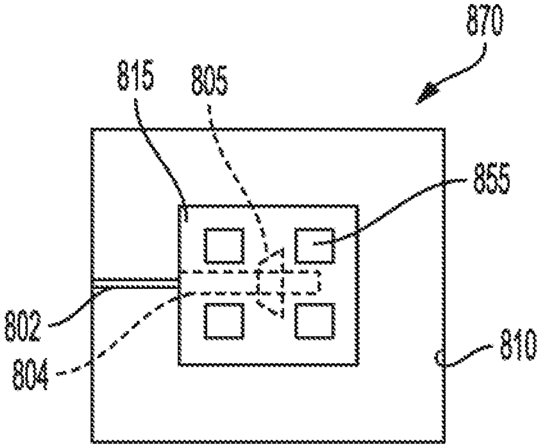
FIG. 17 is a simplified top view of an aperture-coupled antenna, in accordance with another embodiment of the present invention.

FIG. 17 is a simplified top view of an aperture-coupled FCD antenna 870, in accordance with another embodiment of the present invention. Antenna 870 is similar to antenna 850 except that in antenna 870 slot opening 805 is tapered so as to have a longer edge facing edge 898 of patch radiator 815 relative to its other edge facing edge 888 of the patch. Opening 805 may have a trapezoid shape. Exemplary embodiments of the aperture-coupled FCD antennas shown in FIGS. 15, 16 and 17 have a higher bandwidth compared to the antenna embodiment shown in FIG. 14A.

Figure 18:
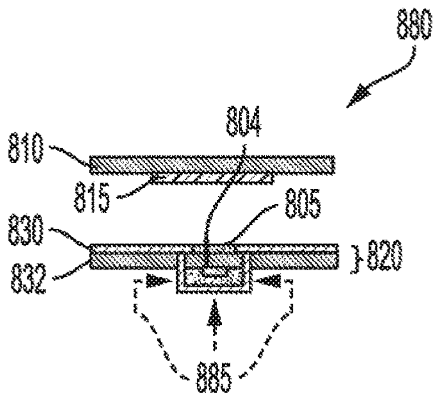
FIG. 18 is a simplified side view of a cavity-backed aperture-coupled antenna, in accordance with yet another embodiment of the present invention.

FIG. 18 is a simplified side view of an aperture-coupled FCD antenna 880, in accordance with yet another embodiment of the present invention. Antenna 880 is similar to antenna 850 shown in FIGS. 14A, 14B and 14C except that in antenna 888 the transmission line section 804 positioned below slot 805 is enclosed within conducting walls 885. Accordingly, antenna 880 eliminates back radiation and has a substantially improved front-to-back radiation ratio.

An FCD antenna, in accordance with any of the embodiment described herein, may be used as a stand-alone antenna or as an element of an antenna array, such as a phased arrays. When used to form a large-scale antenna array, the antenna array is adapted to collapse, roll, be stored, transported and subsequently be unrolled, and conform to the contours of the surface on which it is deployed. An FCD antenna may be advantageously deployed in space-based solar power transfer, space-based communication systems, portable emergency beacon, curtain-type transmitters and receivers, wearable devices, and conformal and real-time adaptive systems.

Figure 19A:
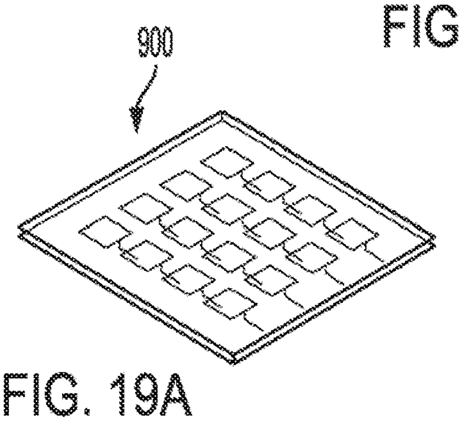
FIG. 19A shows a 4×4 linearly polarized single-feed microstrip-based antenna array, in accordance with another embodiment of the present invention.
Figure 19B:
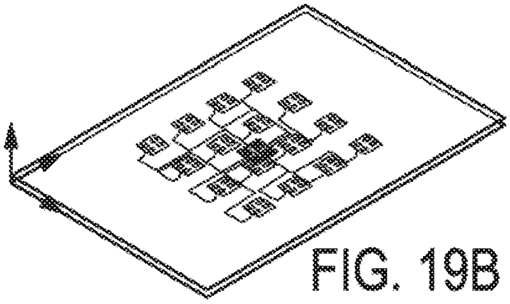
FIG. 19B shows a 4×4 linearly polarized single-feed fractal antenna array with interdigital capacitor and taper feed transition, in accordance with another embodiment of the present invention.
Figure 19C:
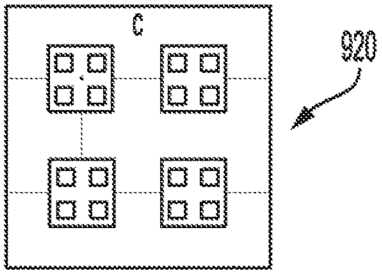
FIG. 19C shows a 2×2 linearly polarized aperture-coupled fractal antenna array, in accordance with another embodiment of the present invention.
Figure 19D:
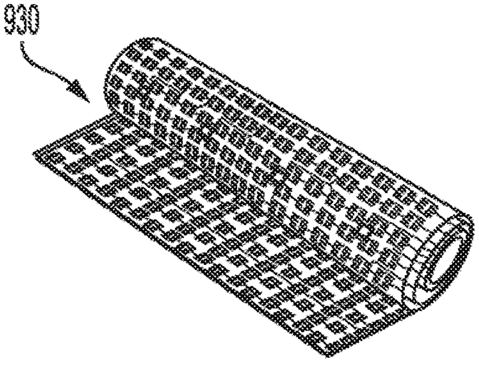
FIG. 19D shows a large array of fractal antennas after being collapsed and rolled, in accordance with another embodiment of the present invention.
Figure 19E:
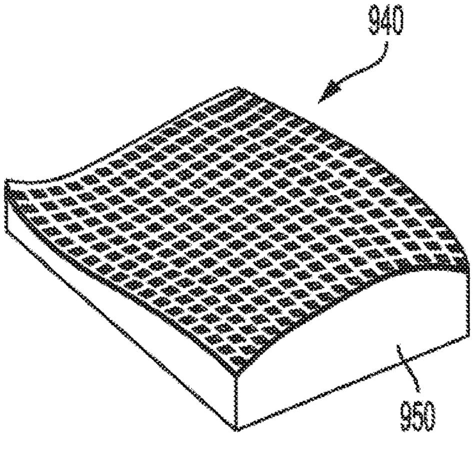
FIG. 19E shows a large array of fractal antennas after being unrolled and deployed on a curved surface, in accordance with another embodiment of the present invention.

FIG. 19A shows a 4×4 linearly polarized single-feed microstrip-based FCD patch antenna array 900. FIG. 19B shows a 4×4 linearly polarized single-feed FCD fractal antenna array 910 with feed transition including interdigital capacitor and tapered section. FIG. 19C shows a 2×2 linearly polarized aperture-coupled FCD fractal antenna array 920. FIG. 19D shows a large array 930 of FCD fractal antennas after being collapsed and rolled. FIG. 19E shows a large array 940 of FCD fractal antennas after being deployed. It is seen from FIG. 19E that the antenna array 940 conforms to the contours of the curved surface of object 950 on which the antenna array is placed.

The above embodiments of the present invention are illustrative and not limitative. The above embodiments of the present invention are not limited by the radiating metallic patterns, shapes, size or radiation characteristic, transmission line shapes, sizes or types, such as microstrip-line, coplanar waveguide, and otherwise. The above embodiments of the present invention are not limited by any particular impedance matching technique or size. The above embodiments of the present invention are not limited by any particular configuration of the transmission line layer or any particular configuration of ground plane, which may be a solid plane, a meshed plane and otherwise. Other additions, subtractions or modifications are obvious in view of the present disclosure and are intended to fall within the scope of the appended claims.

What is claimed is:

1. An antenna comprising:

a first flexible board comprising a radiating metal patch, and a foldable, collapsible, and deployable first feed transition adapted to deliver an RF signal to the radiating patch; and a second flexible board spaced away from the first flexible board by air/vacuum gap dielectric and comprising a ground layer and a first transmission line, wherein pushing forward the first flexible board causes the first feed transition to collapse towards the second flexible board thus causing the first flexible board to collapse onto the second flexible board, and wherein prior to the collapse, the first and second flexible boards are positioned at different heights.

2. The antenna of claim 1 wherein the first transmission line delivers the RF signal from an integrated circuit or an external source to the first feed transition.

3. The antenna of claim 1 wherein the first flexible board further comprises a second transmission line receiving the RF signal from the first feed transition and delivering the received RF signal to the radiating patch.

4. The antenna of claim 2 wherein the first flexible board further comprises an opening extending from an edge of the radiating metal patch towards an edge of the second flexible board to facilitate folding, unfolding, collapsing and deployment of the antenna.

5. The antenna of claim 4 wherein a ground plane, defined by the ground layer, and the first transmission line are on different planes.

6. The antenna of claim 4 wherein a ground plane, defined by the ground layer, and the first transmission line are coplanar.

7. The antenna of claim 2 wherein the first transmission line comprises a quarter-wave transmission line.

8. The antenna of claim 1 wherein the radiating metal patch comprises a plurality of insets.

9. The antenna of claim 2 wherein the first feed transition is tapered so as to have an increasing width along a vertical direction from the second flexible board toward the first flexible board.

10. The antenna of claim 9 further comprising an interdigital capacitor having a first plurality of metal fingers connected to the radiating metal patch and a second plurality of metal fingers connected to the tapered section of the first feed transition, said tapered feed transition adapted to deliver the RF signal to the radiating patch via the interdigital capacitor.

11. The antenna of claim 1 wherein the radiating metal patch is positioned so as to have a 45° rotational angle relative to the first flexible board, wherein said first feed transition is connected to a corner of the radiating patch.

12. The antenna of claim 1 wherein the first feed transition is connected to an edge of the radiating metal patch.

13. The antenna of claim 1 wherein each of a plurality of corners of the radiating metal patch has a cut.

14. The antenna of claim 10 wherein said radiating metal patch comprises a plurality of symmetrically positioned cuts each extending along an entire depth of the radiating metal patch.

15. The antenna of claim 14 wherein said cuts are square cuts.

16. The antenna of claim 14 wherein said ground layer comprises a plurality of cuts each extending along an entire depth of the ground layer.

17. The antenna of claim 14 wherein the radiating metal patch is rotated by 45° angle relative the first flexible board, wherein the first feed transition is coupled to a first edge of the radiating patch via a first port, and wherein said first flexible board comprises a second foldable feed transition coupled to a second edge of the radiating patch via a second port, wherein said first and second edges of the radiating patch are orthogonal to one another.

18. The antenna of claim 17 wherein said first and second ports are triangular ports.

19. The antenna of claim 18 wherein said first and second feed transitions are independently controlled.

20. The antenna of claim 19 wherein each of said first and second feed transitions is tapered so that each has an increasing width along a vertical direction from the second flexible board toward the first flexible board.

21. The antenna of claim 20 further comprising first and second interdigital capacitors each having a first plurality of metal fingers connected to the radiating patch, wherein a second plurality of metal fingers of the first interdigital capacitor is connected to the tapered section of the first feed transition, and wherein a second plurality of metal fingers of the second interdigital capacitor is connected to the tapered section of the second feed transition, said first tapered feed transition adapted to deliver the RF signal to the radiating patch via the first interdigital capacitor, and said second tapered feed transition adapted to deliver the RF signal to the radiating patch via the second interdigital capacitor.

22. The antenna of claim 21 further comprising:

delivering the RF signal via the first feed transition to the radiating patch during a first plurality of time periods;

delivering the RF signal via the second feed transition to the radiating patch during a second plurality of time periods, wherein said first plurality of time periods and said second plurality of time periods are non-overlapping time periods, wherein each of a first subset of the first plurality of time periods occurs between a pair of successive second time periods.

23. The antenna of claim 21 further comprising:

varying a phase and an amplitude of the RF signal delivered via the first feed transition to the radiating patch; and varying a phase and an amplitude of the RF signal delivered via the second feed transition to the radiating patch.

24. The antenna of claim 1 wherein said first and second flexible boards comprise polyimide.

25. A method of forming an antenna comprising:

disposing a radiating metal patch and a foldable, collapsible, and deployable first feed transition on a first flexible board, said first feed transition adapted to deliver an RF signal to the radiating patch, and disposing a ground layer and a first transmission line on a second flexible board spaced away from the first flexible board by air or vacuum, wherein pushing forward the first flexible board causes the first feed transition to collapse towards the second flexible board thus causing the first flexible board to collapse onto the second flexible board, and wherein prior to the collapse, the first and second flexible boards are positioned at different heights.

26. The method of claim 25 wherein the first transmission line is adapted to deliver the RF signal from an integrated circuit or an external source to the first feed transition.

27. The method of claim 25 further comprising:

disposing on the first flexible board a second transmission line adapted to receive the RF signal from the first feed transition and deliver the received RF signal to the radiating patch.

28. The antenna of claim 26 further comprising:

forming an opening extending from an edge of the radiating metal patch towards an edge of the first flexible board to facilitate folding, unfolding, collapsing and deployment of the antenna.

29. The method of claim 28 wherein a ground plane, defined by the ground layer, and the first transmission line are on different planes.

30. The method of claim 28 wherein a ground plane, defined by the ground layer, and the first transmission line are coplanar.

31. The method of claim 26 wherein the first transmission line comprises a quarter-wave transmission line.

32. The method of claim 25 wherein the radiating metal patch comprises a plurality of insets.

33. The method of claim 26 wherein the first feed transition is tapered so as to have an increasing width along a vertical direction from the second flexible board toward the first flexible board.

34. The method of claim 33 further comprising:

disposing an interdigital capacitor having a first plurality of metal fingers connected to the radiating patch and a second plurality of metal fingers connected to the tapered section of the first feed transition, said first tapered feed transition adapted to deliver the RF signal to the radiating patch via the interdigital capacitor.

35. The method of claim 25 further comprising:

positioning the radiating patch so that the radiating patch has a 45° rotational angle relative to the first flexible board; and connecting the first feed transition to a corner of the radiating metal patch.

36. The method of claim 25 further comprising:

connecting the first feed transition to an edge of the radiating metal patch.

37. The method of claim 25 wherein each of a plurality of corners of the radiating metal patch has a cut.

38. The method of claim 34 further comprising:

forming, in the radiating patch, a plurality of symmetrically positioned cuts each extending along an entire depth of the radiating metal patch.

39. The method of claim 38 wherein said cuts are square cuts.

40. The method of claim 38 further comprising:

forming, in the ground layer, a plurality of cuts each extending along an entire depth of the ground layer.

41. The method of claim 38 further comprising:

rotating the radiating patch by 45° angle relative the first board;

connecting the first feed transition to a first edge of the radiating metal patch via a first port, connecting a second foldable feed transition disposed on the second flexible board to a second edge of the radiating patch via a second port, wherein said first and second edges of the radiating patch are orthogonal to one another.

42. The method of claim 41 wherein said first and second ports are triangular ports.

43. The method of claim 42 further comprising:

controlling the first feed transition independently from the second feed transition.

44. The method of claim 43 further comprising:

tapering each of the first and second feed transitions so that each has an increasing width along a vertical direction from the second flexible board toward the first flexible board.

45. The method of claim 44 further comprising:

forming first and second interdigital capacitors each having a first plurality of metal fingers connected to the radiating patch, connecting a second plurality of metal fingers of the first interdigital capacitor to the tapered section of the first feed transition;

connecting a second plurality of metal fingers of the second interdigital capacitor to the tapered section of the second feed transition;

delivering the RF signal from the first tapered feed transition to the radiating patch via the first interdigital capacitor; and delivering the RF signal from the second tapered feed transition to the radiating patch via the second interdigital capacitor.

46. The method of claim 45 further comprising:

delivering the RF signal via the first feed transition to the radiating patch during a first plurality of time periods;

delivering the RF signal via the second feed transition to the radiating patch during a second plurality of time periods, wherein said first plurality of time periods and said second plurality of time periods are non-overlapping time periods, wherein each of a first subset of the first plurality of time periods occurs between a pair of successive second time periods.

47. The method of claim 45 further comprising:

varying a phase and an amplitude of the RF signal delivered via the first feed transition to the radiating patch; and varying a phase and an amplitude of the RF signal delivered via the second feed transition to the radiating patch.

48. The method of claim 25 wherein said first and second flexible boards comprise polyimide.

* * * * *